US006406231B1

(12) United States Patent
Landoll et al.

(10) Patent No.: US 6,406,231 B1
(45) Date of Patent: Jun. 18, 2002

(54) CONTAINER LOCKDOWN DEVICE

(75) Inventors: Donald R. Landoll, Marysville, KS (US); Sterling W. Gunter, Shreveport, LA (US); Keith Vacha, Marysville, KS (US)

(73) Assignee: Landoll Corporation, Marysville, KS (US)

( * ) Notice: Subject to any disclaimer, the term of this patent is extended or adjusted under 35 U.S.C. 154(b) by 0 days.

(21) Appl. No.: 09/422,908

(22) Filed: Oct. 21, 1999

Related U.S. Application Data

(63) Continuation-in-part of application No. 09/084,126, filed on May 22, 1998, now Pat. No. 6,126,378.

(51) Int. Cl.$^7$ .................................................. B60P 7/08
(52) U.S. Cl. ............................ 410/66; 410/52; 410/67; 410/77; 410/80; 414/494
(58) Field of Search .............................. 410/66, 67, 52, 410/68, 77, 80, 90, 91, 81; 248/500, 503; 220/1.5; 414/494

(56) References Cited

U.S. PATENT DOCUMENTS

| 1,360,412 A | * 11/1920 | Kirchner ..................... 410/67 |
| 1,402,211 A | * 1/1922 | Cartmill ..................... 410/66 |
| 2,313,335 A | * 3/1943 | Godfrey .................. 410/67 X |
| 2,351,314 A | * 6/1944 | Aris ............................ 410/67 |
| 2,736,602 A | * 7/1956 | Ault ............................ 410/67 |
| 3,984,117 A | * 10/1976 | Bates et al. .................... 410/66 |
| 4,746,261 A | 5/1988 | Landoll et al. |
| 5,013,056 A | 5/1991 | Landoll et al. |
| 5,211,413 A | 5/1993 | Williams et al. |
| 6,126,378 A | * 10/2000 | Landoll et al. |

OTHER PUBLICATIONS

Tandemloc, Inc. brochure entitled "Tandemloc, Inc. The Intermodal Innovators" (publication date unknown), 16 pg.

* cited by examiner

*Primary Examiner*—Stephen T. Gordon
(74) *Attorney, Agent, or Firm*—Hovey Williams LLP

(57) ABSTRACT

A trailer winch assembly (100) is provided for loading containers (52, 53, 94, 96) onto a trailer (50). The winch assembly (100) comprises two movable winch apparatuses (102, 104) mounted on a winch transport assembly (106). A wheel assembly (200) having a rigid wheel frame (202), a wheel (206) rotatably and slidable supported in the wheel frame (202), and an attachment assembly (204) utilizes a jack (298) to raise the container onto the wheel. An off-load foot (350) including a downwardly extending leg (354) having a base (396) for engaging a ground surface (85) is utilized to off-load containers. A container lockdown mechanism (500) includes a securement member (504) attached to the trailer (50), an attachment member (502), and an extension member (506) extended between the container and the securement member (504) to hold the container (52) on the trailer (50). A bottom wheel assembly (600), an intermediate lockdown mechanism (700), a front lockdown mechanism (750), and a container foot (800) to transport the containers (52, 94, 96) with the wheel assemblies (600) and container foot (800) attached to the containers (52, 94, 96). The invention utilizes a universal mounting bracket (602) which can be used to mount a selected one of the wheel assembly (600), the container foot (800), and lockdown extensions (662, 664) which form part of the lockdown mechanisms (700, 750). The wheel assembly (600) includes three wheels (604, 606, 608) rotatably mounted on the mounting bracket (602) by a wheel axle (610) from which the lockdown extensions (662, 664) extend. The front and intermediate lockdown mechanisms (700, 750) each include a securement portion (702, 752) and a trailer attachment portion (704, 754). The container foot (800) includes a pivotally mounted platform (804), and the container foot (800) is held in a container foot receiving slot (814, 816) during transport.

25 Claims, 28 Drawing Sheets

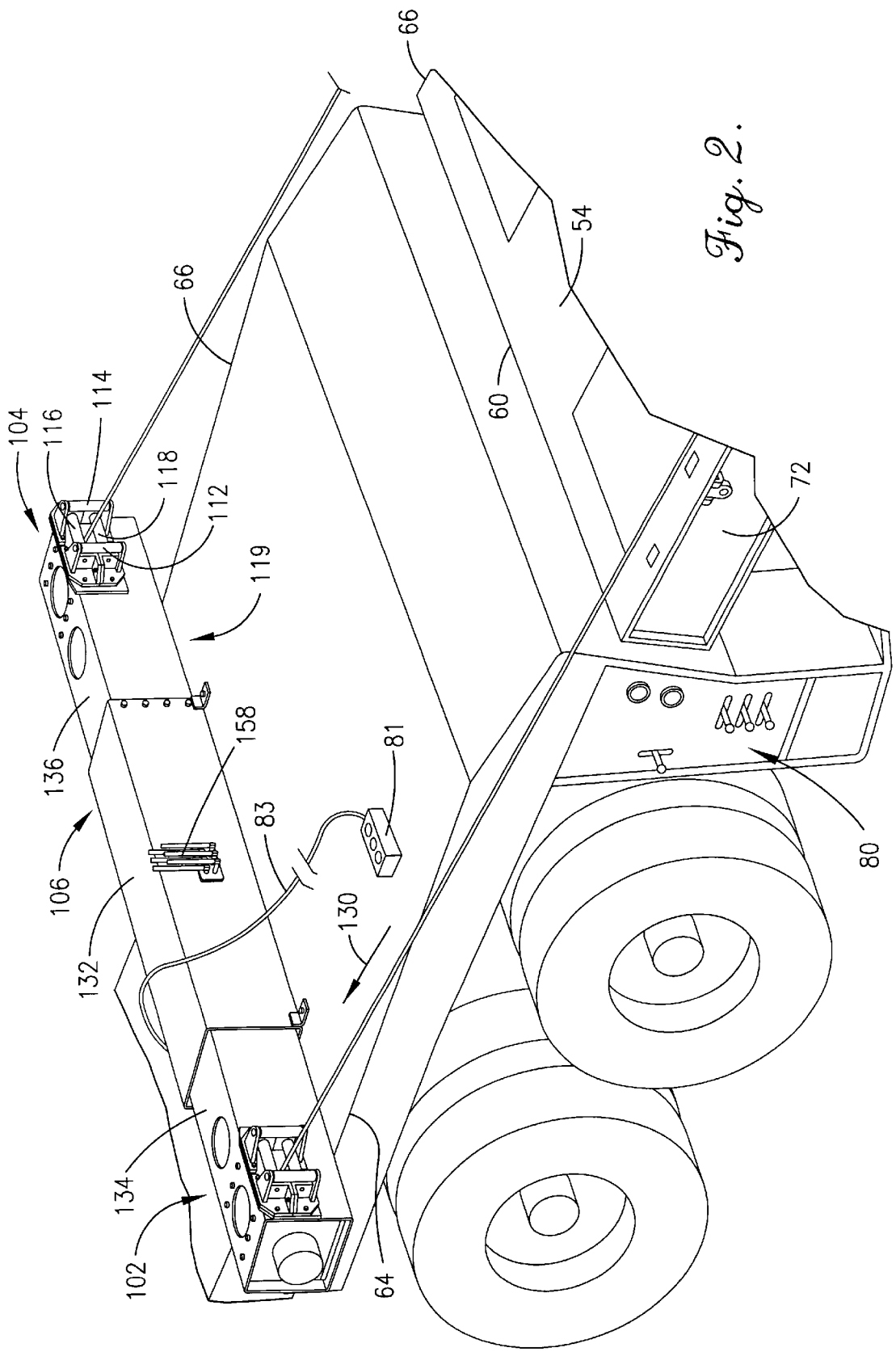

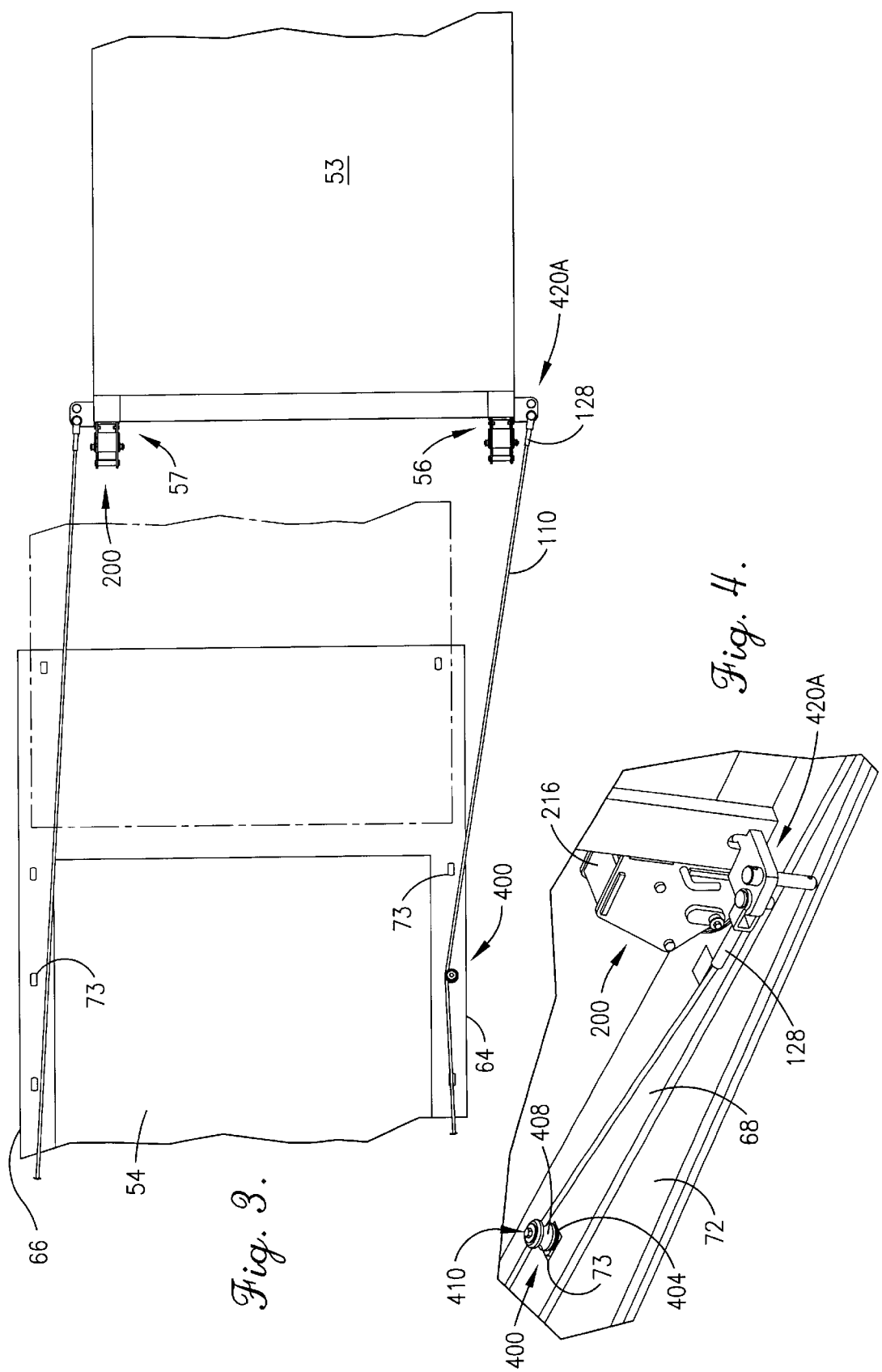

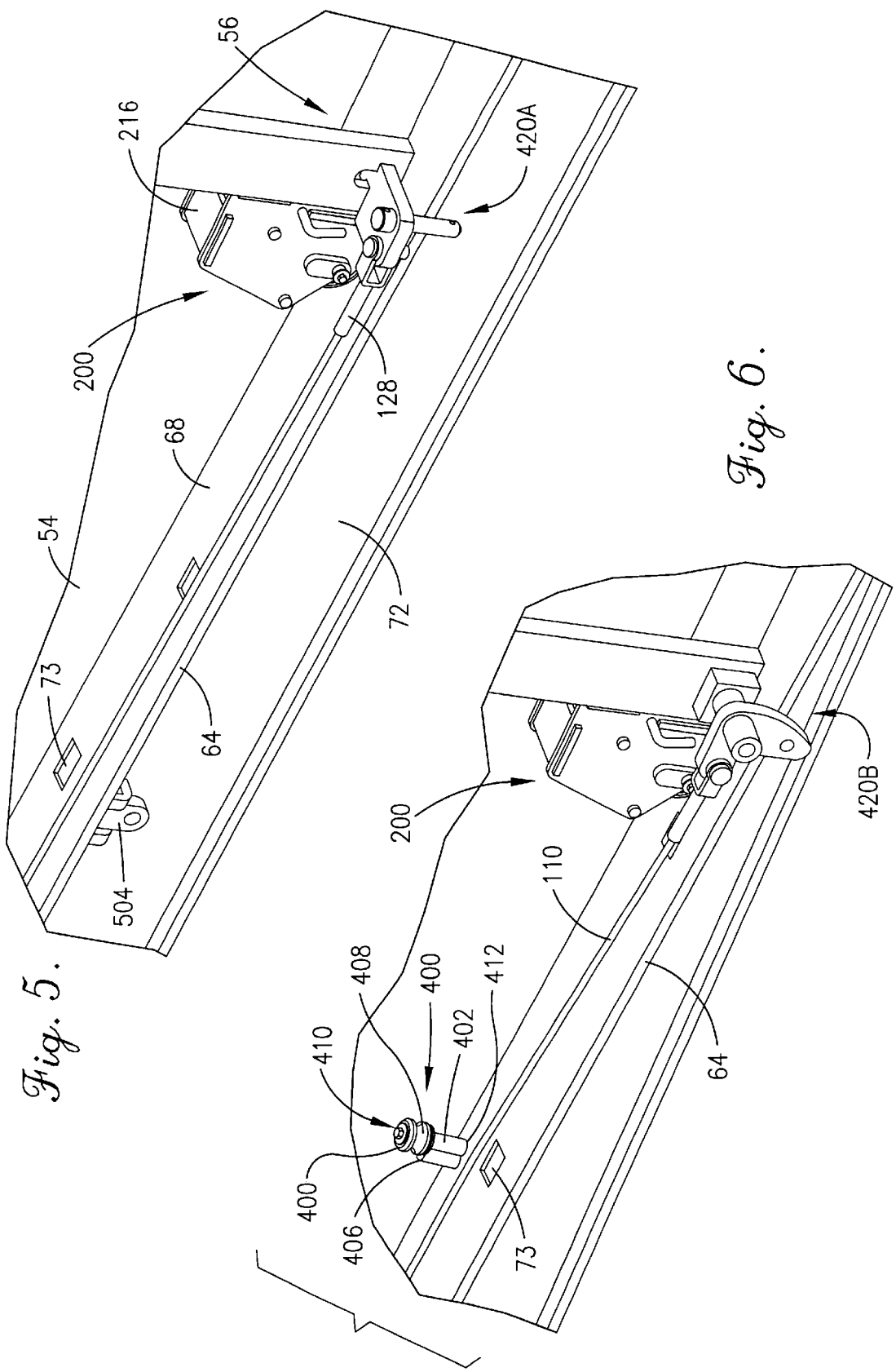

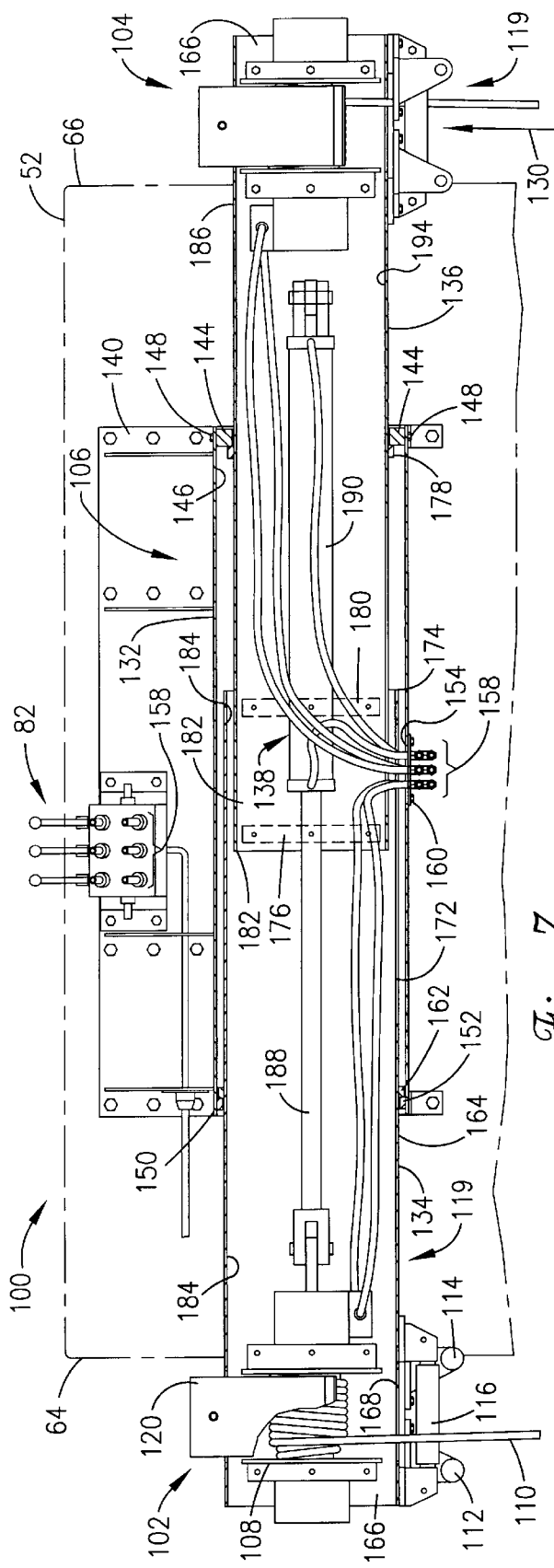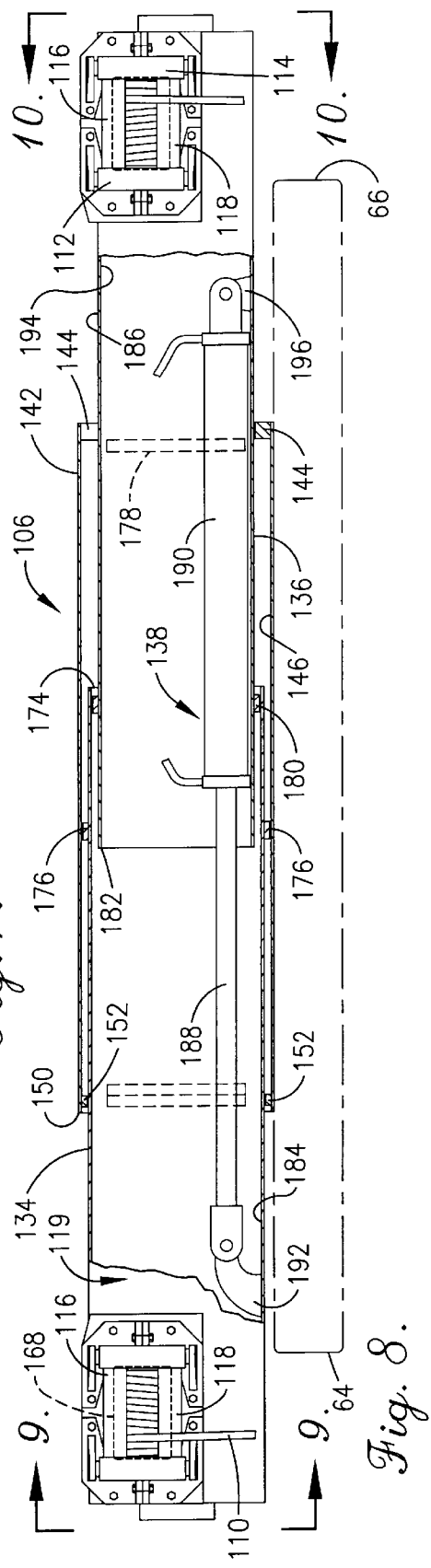

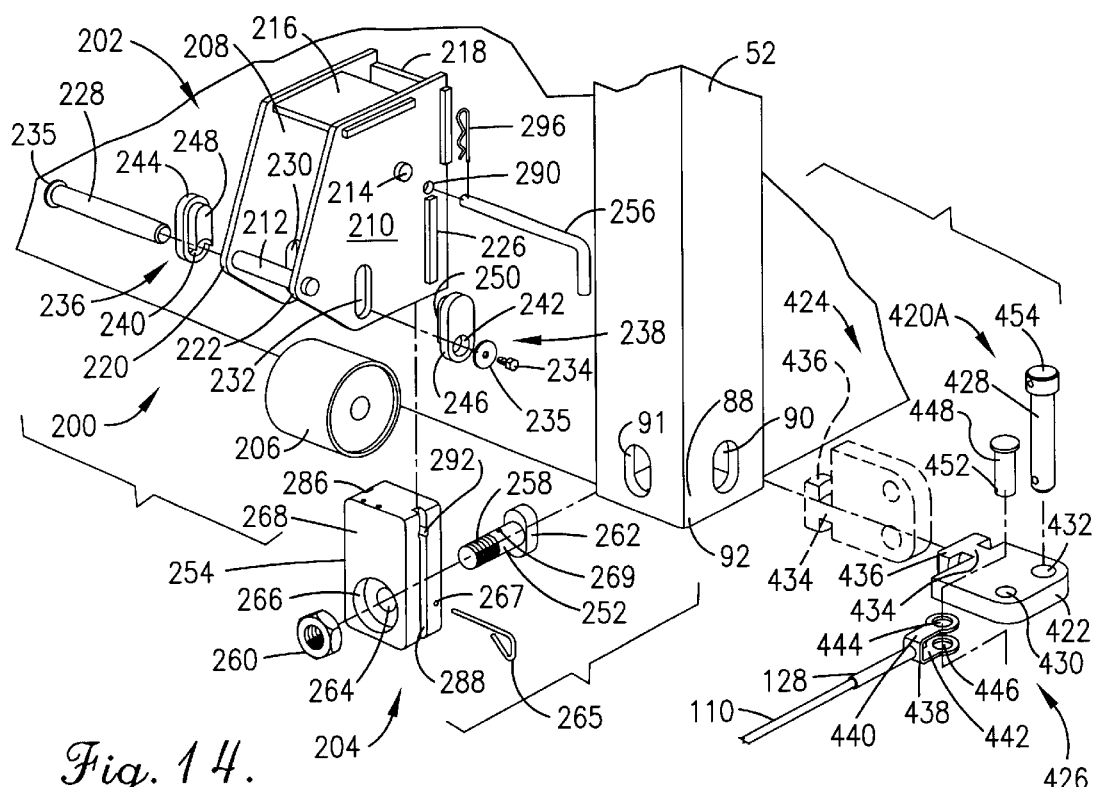
Fig. 14.
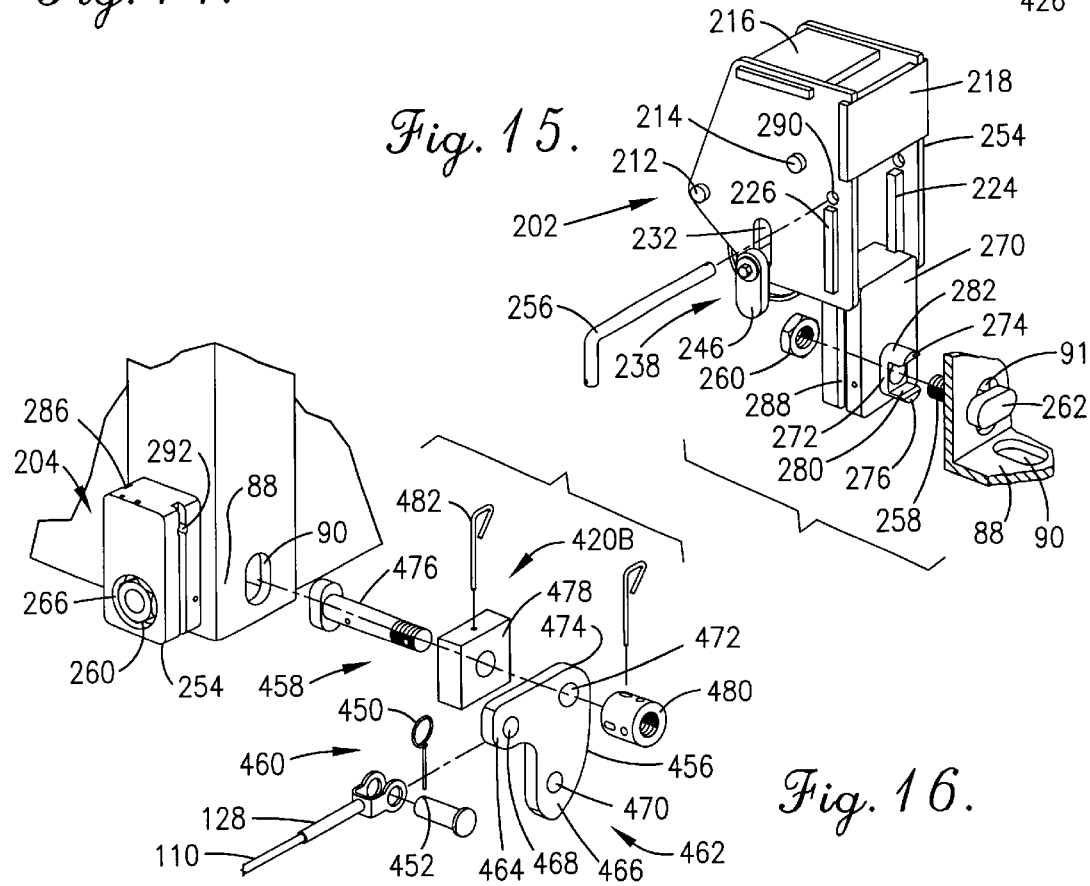
Fig. 15.
Fig. 16.

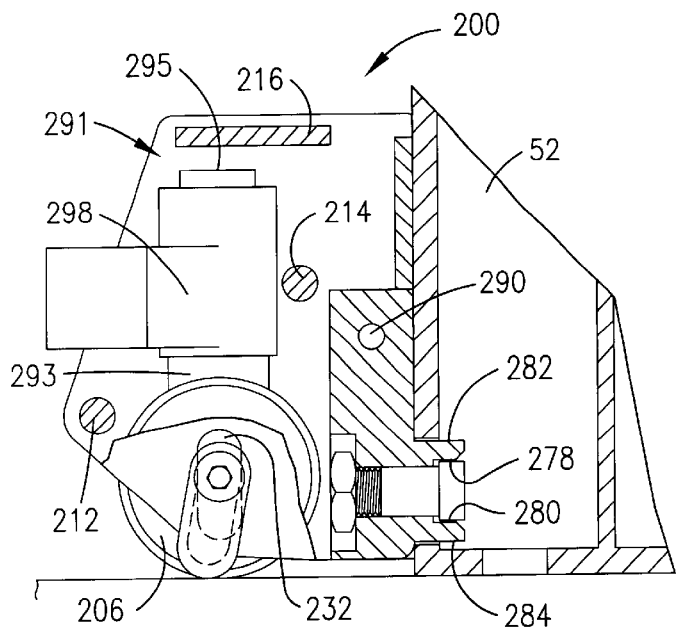
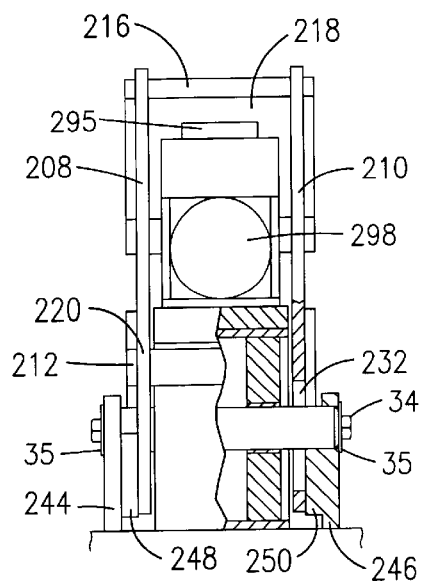
Fig. 17.
Fig. 18.
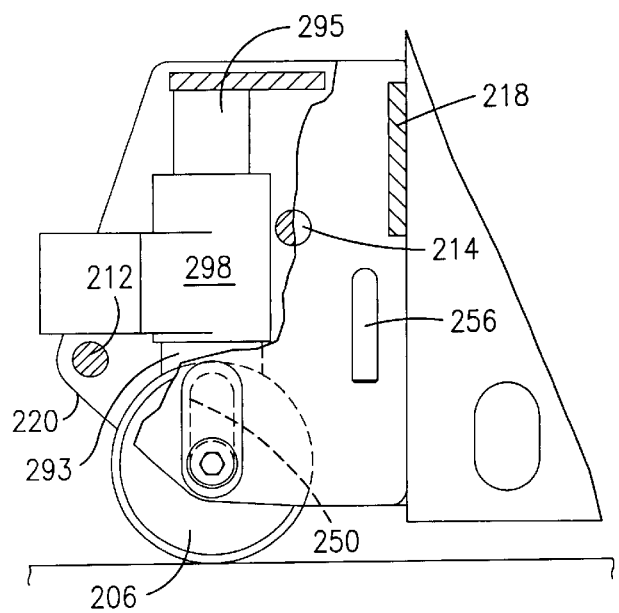
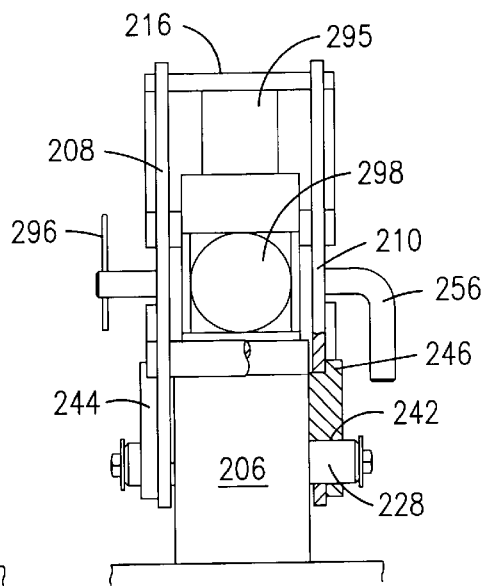
Fig. 19.
Fig. 20.

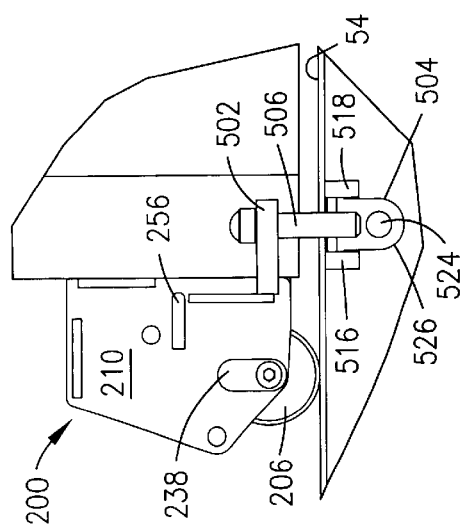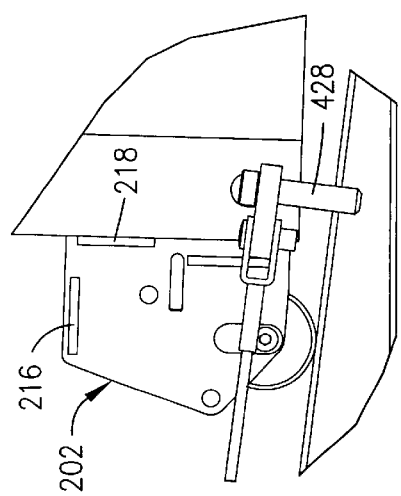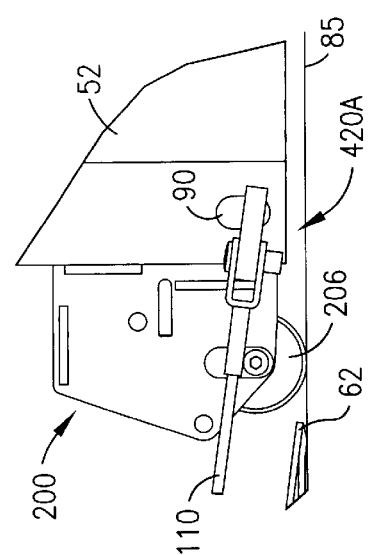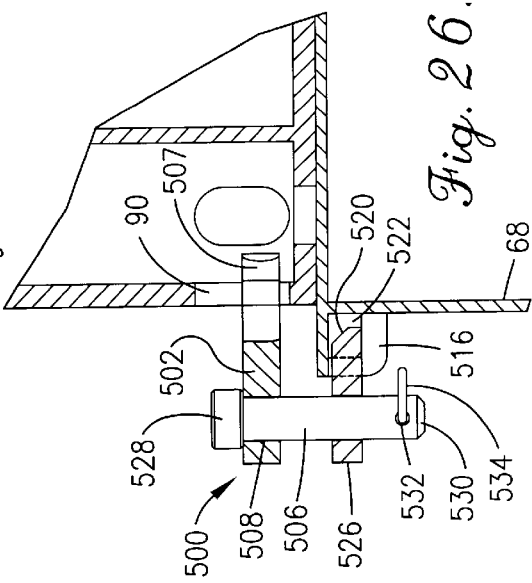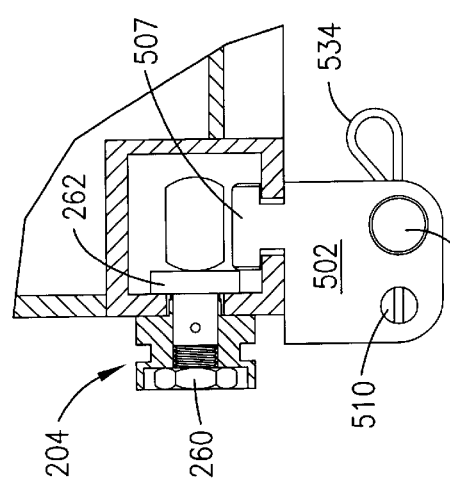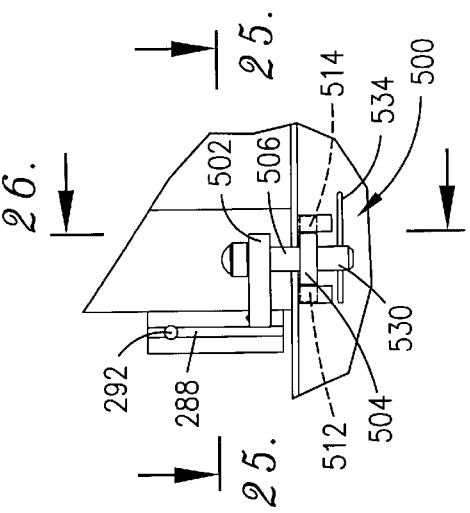

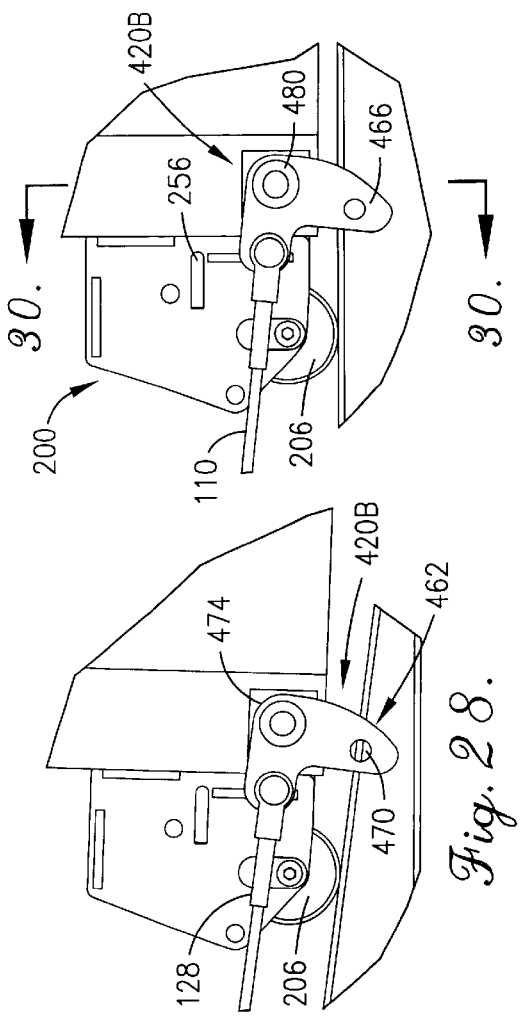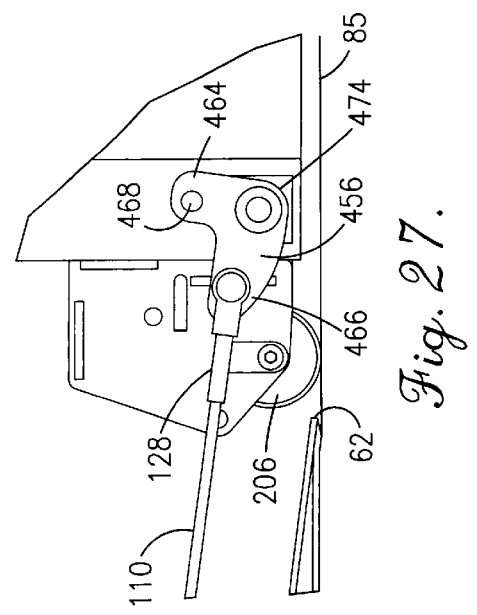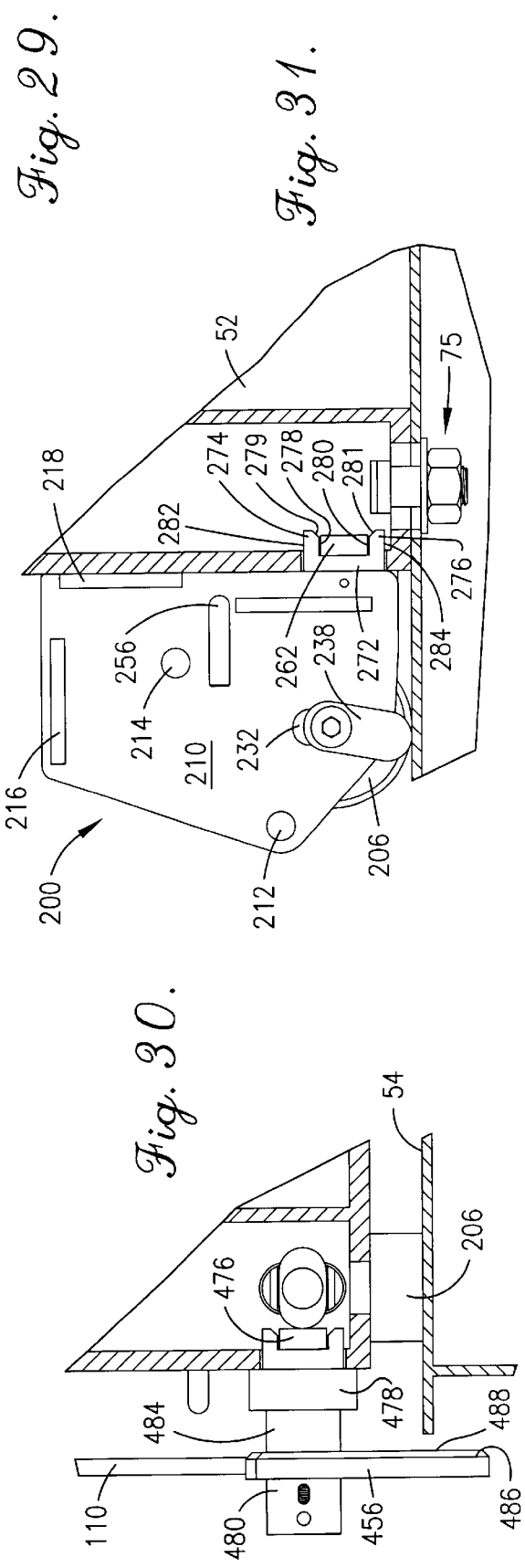

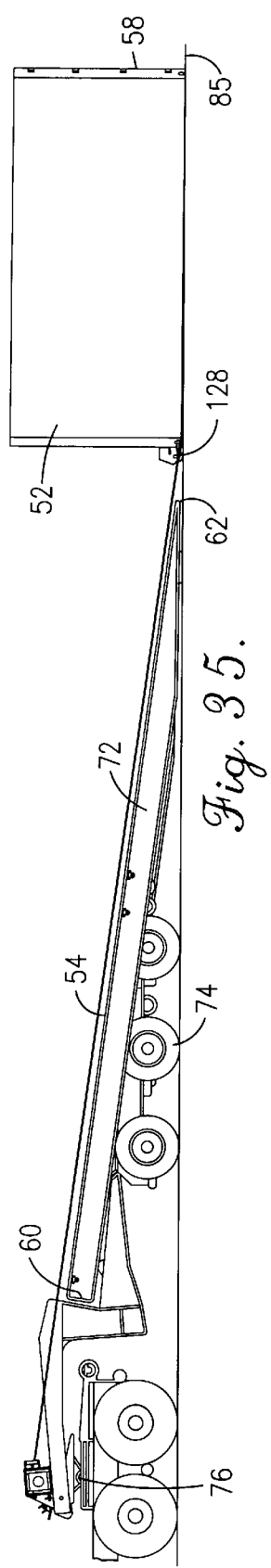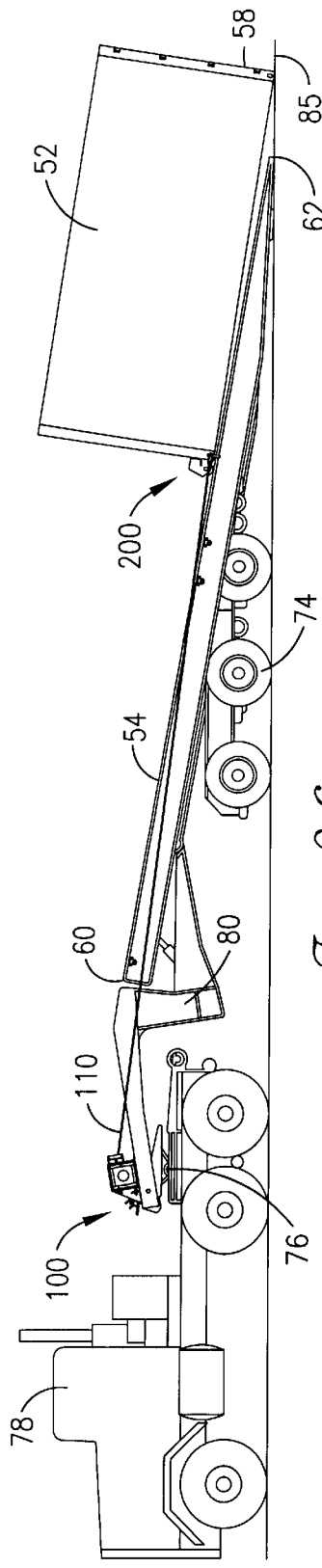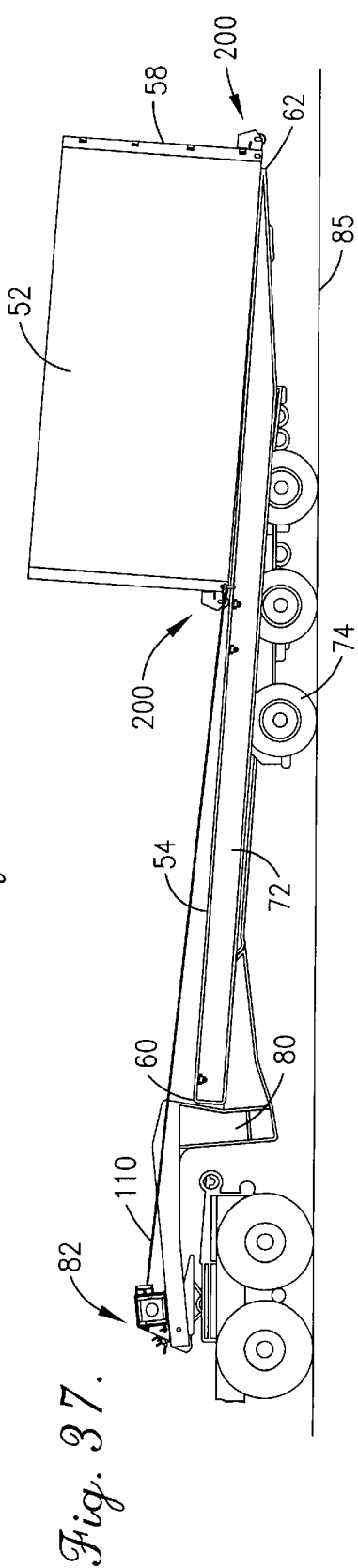

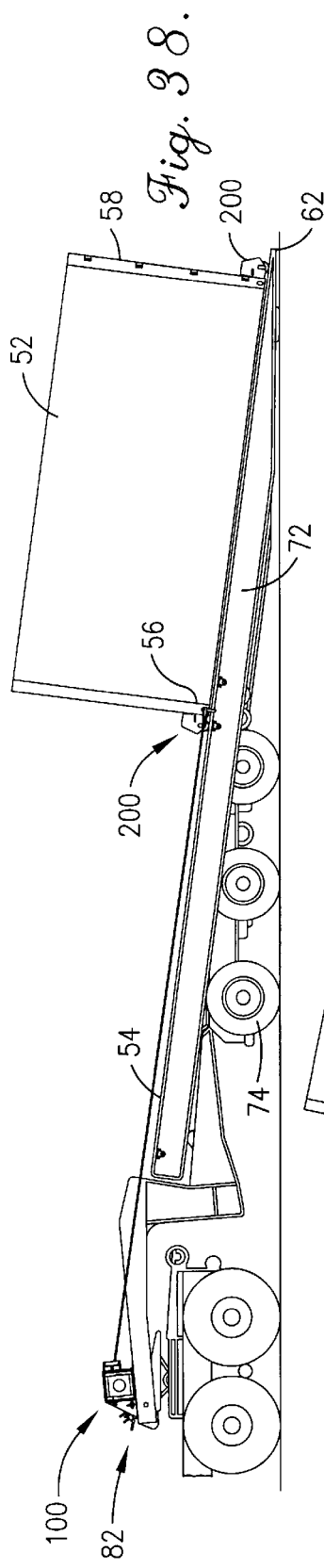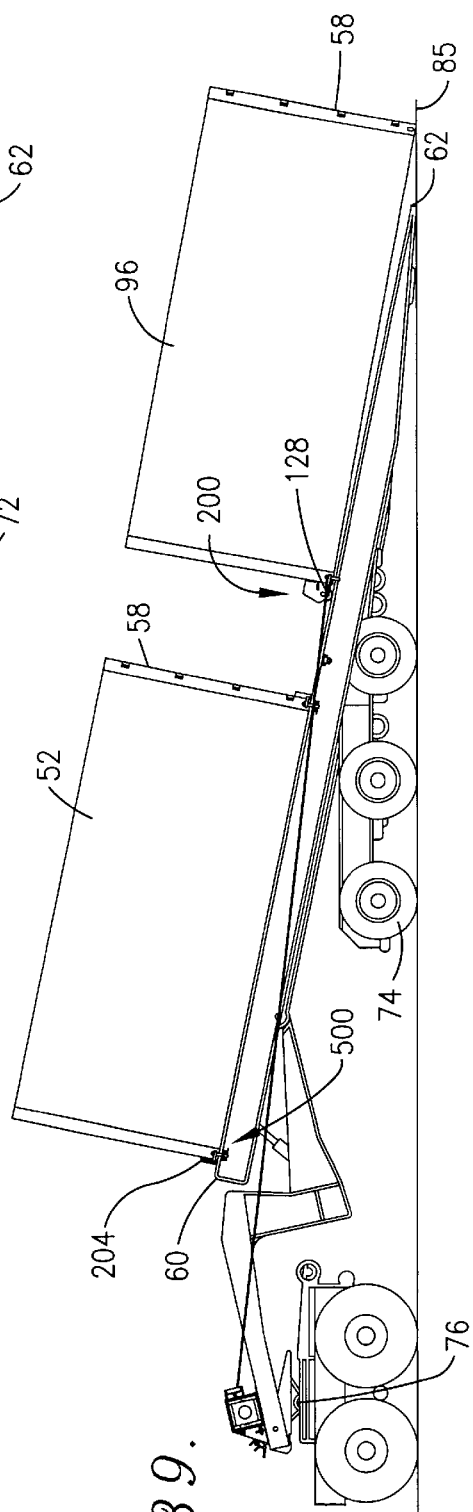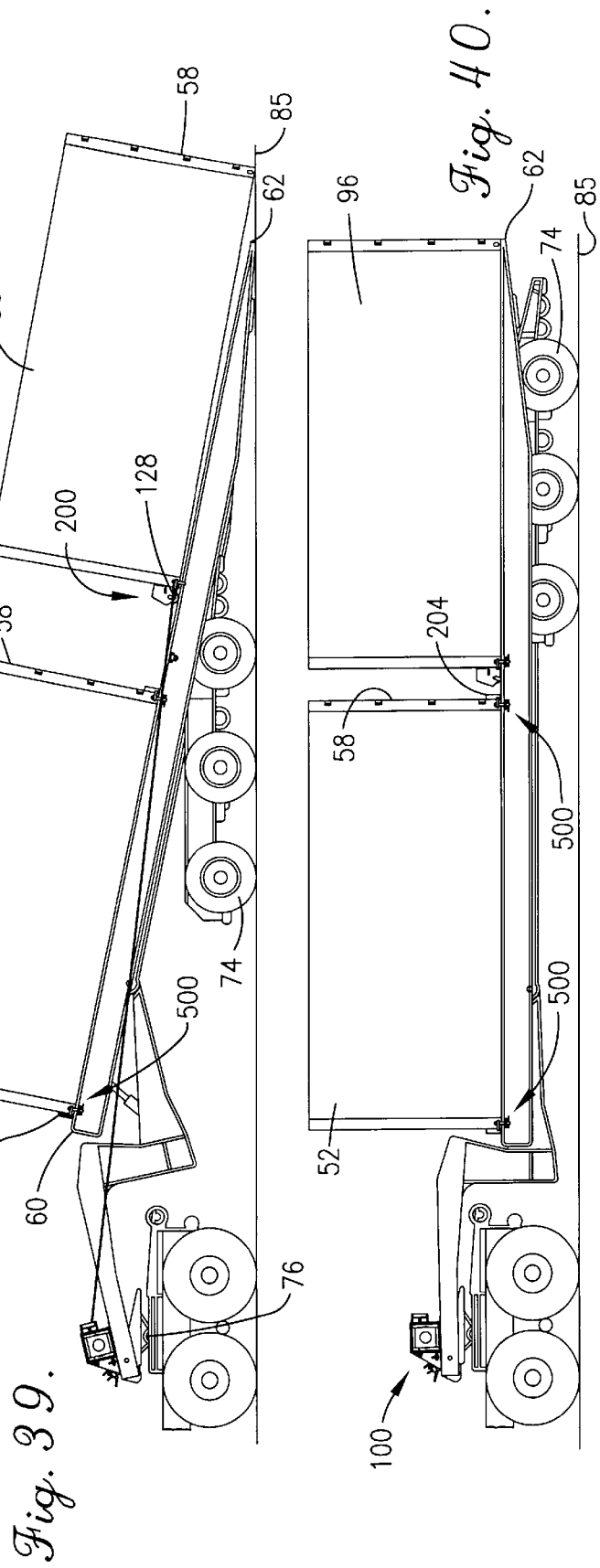

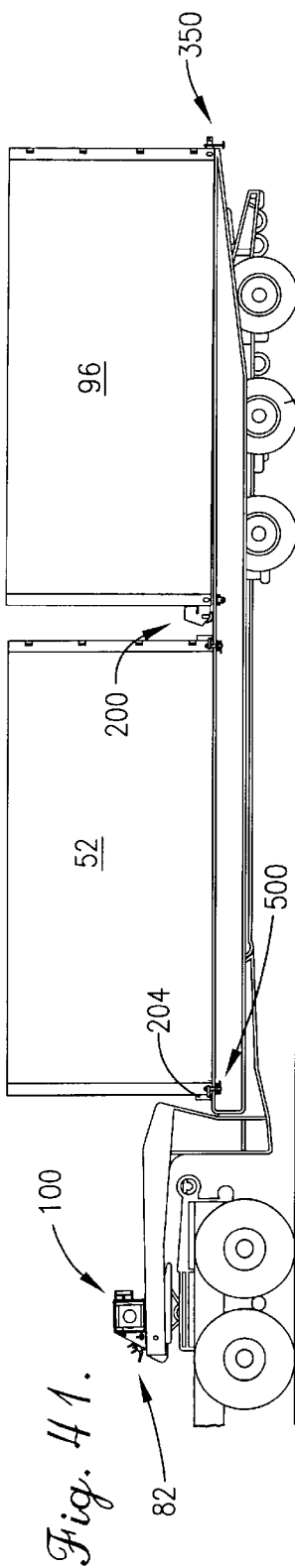
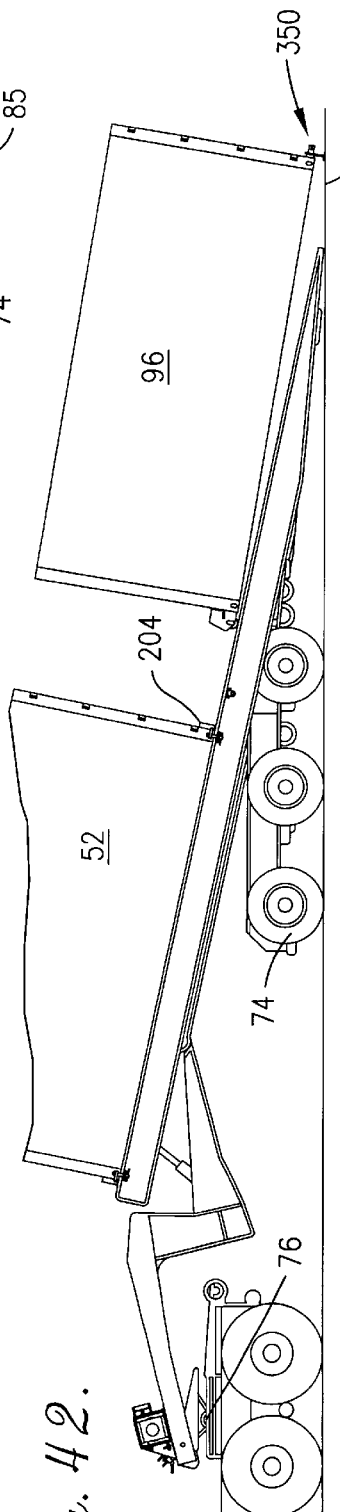
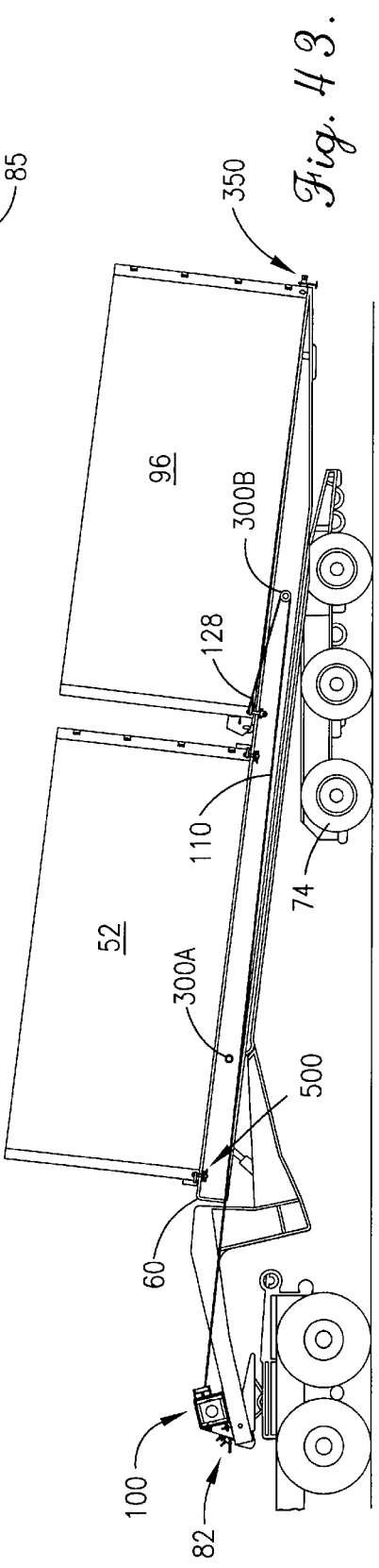

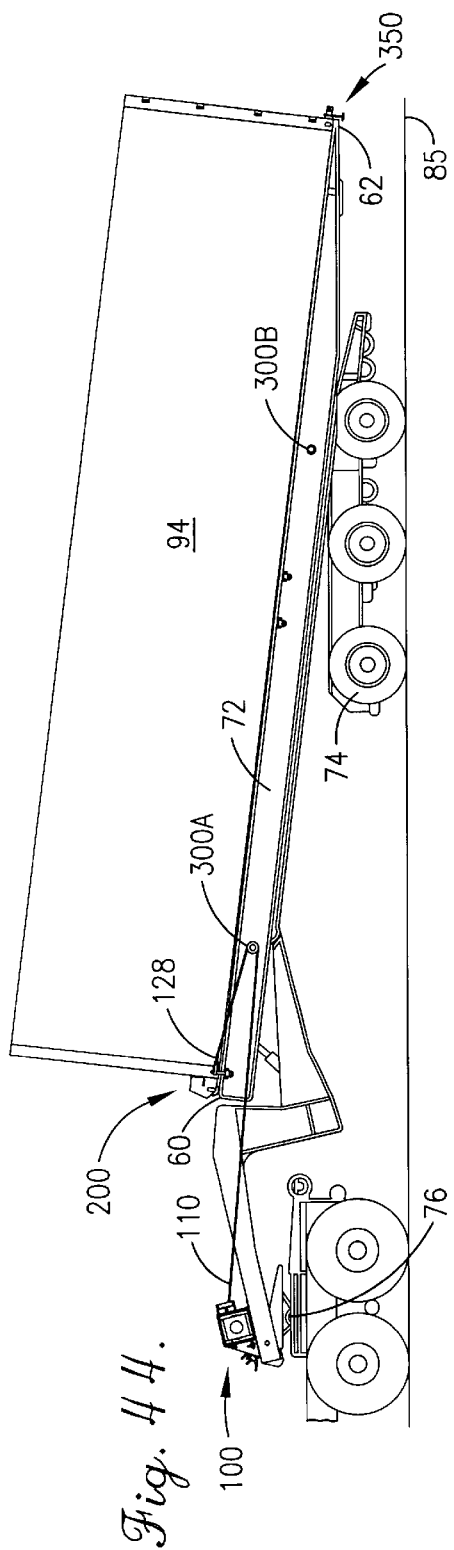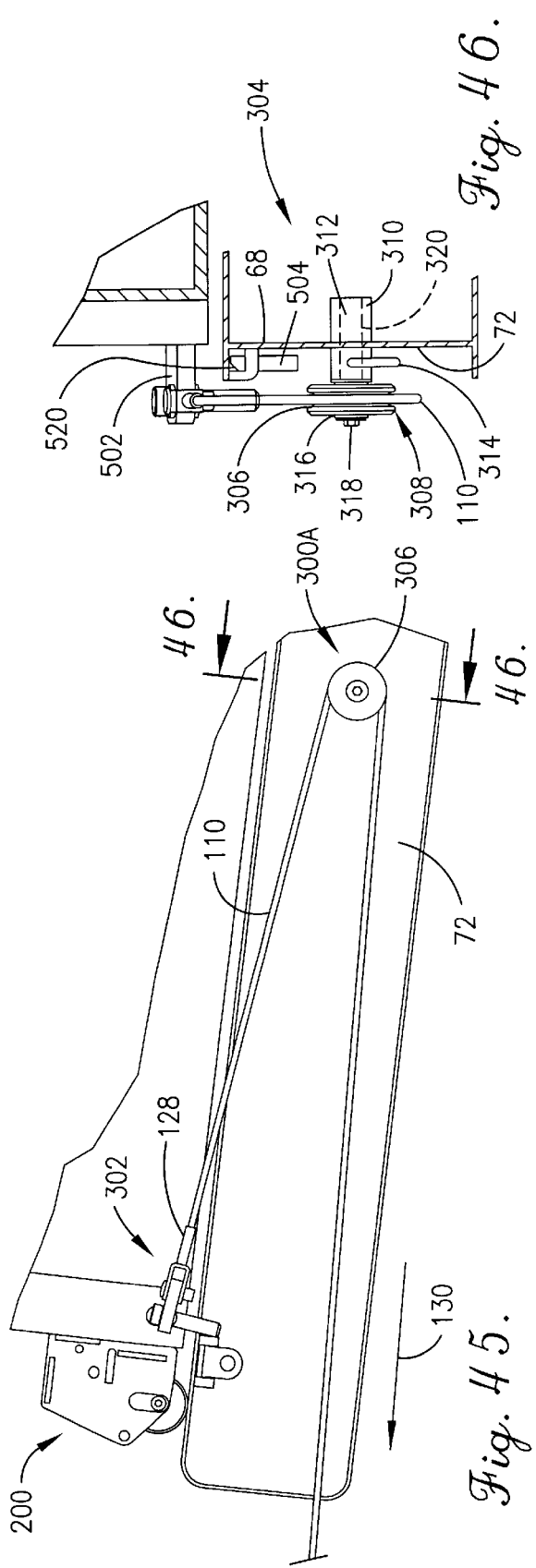

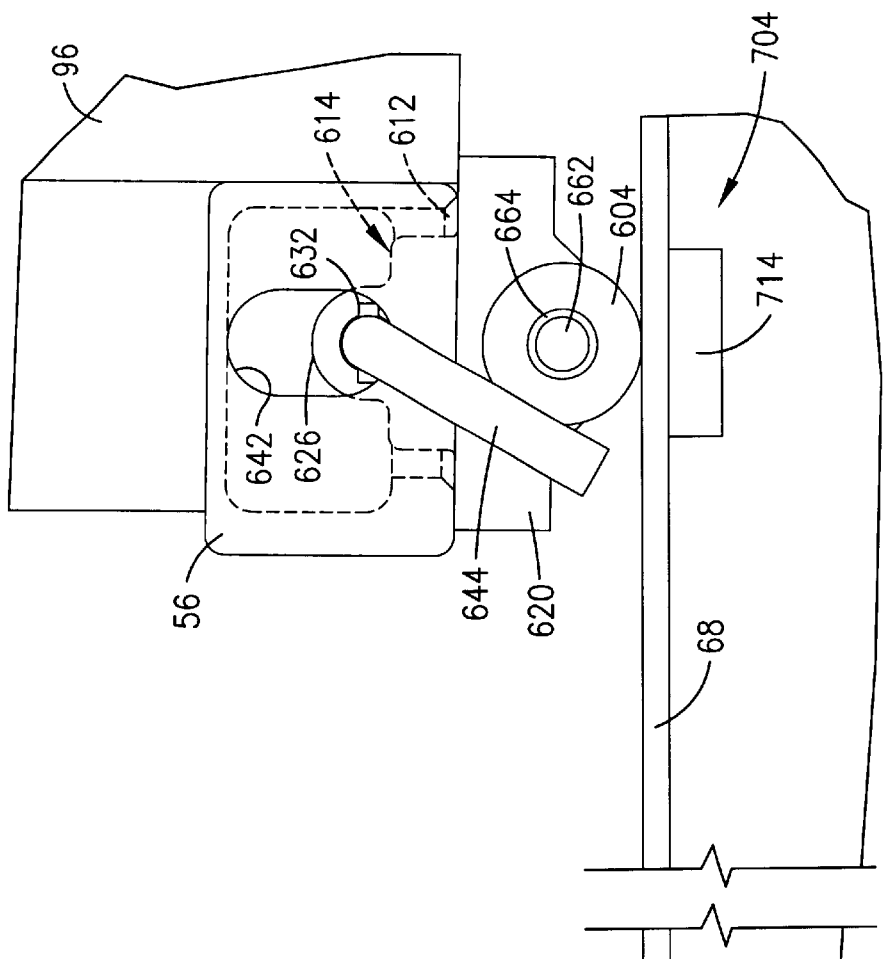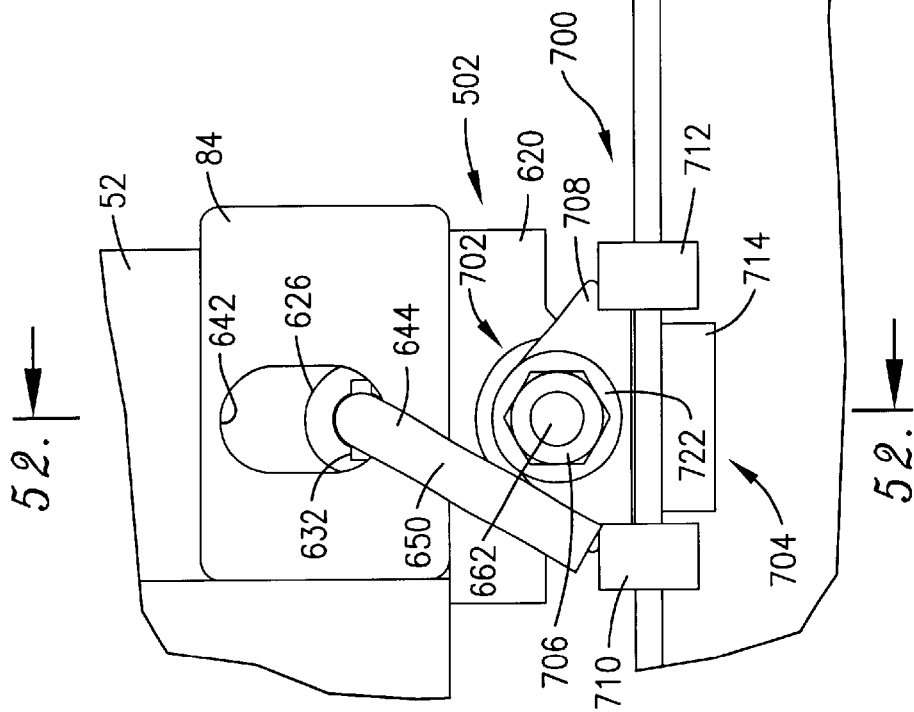

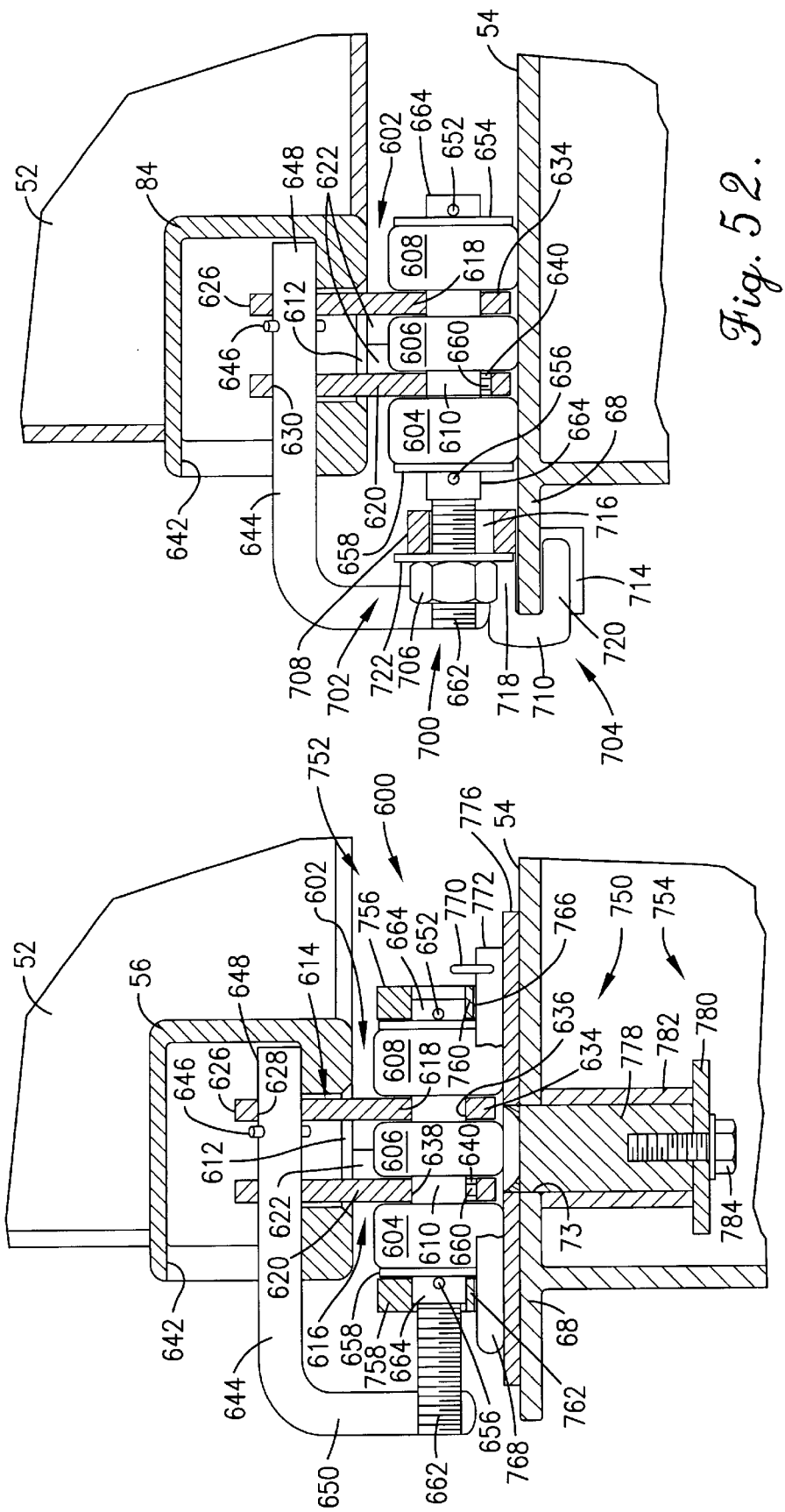

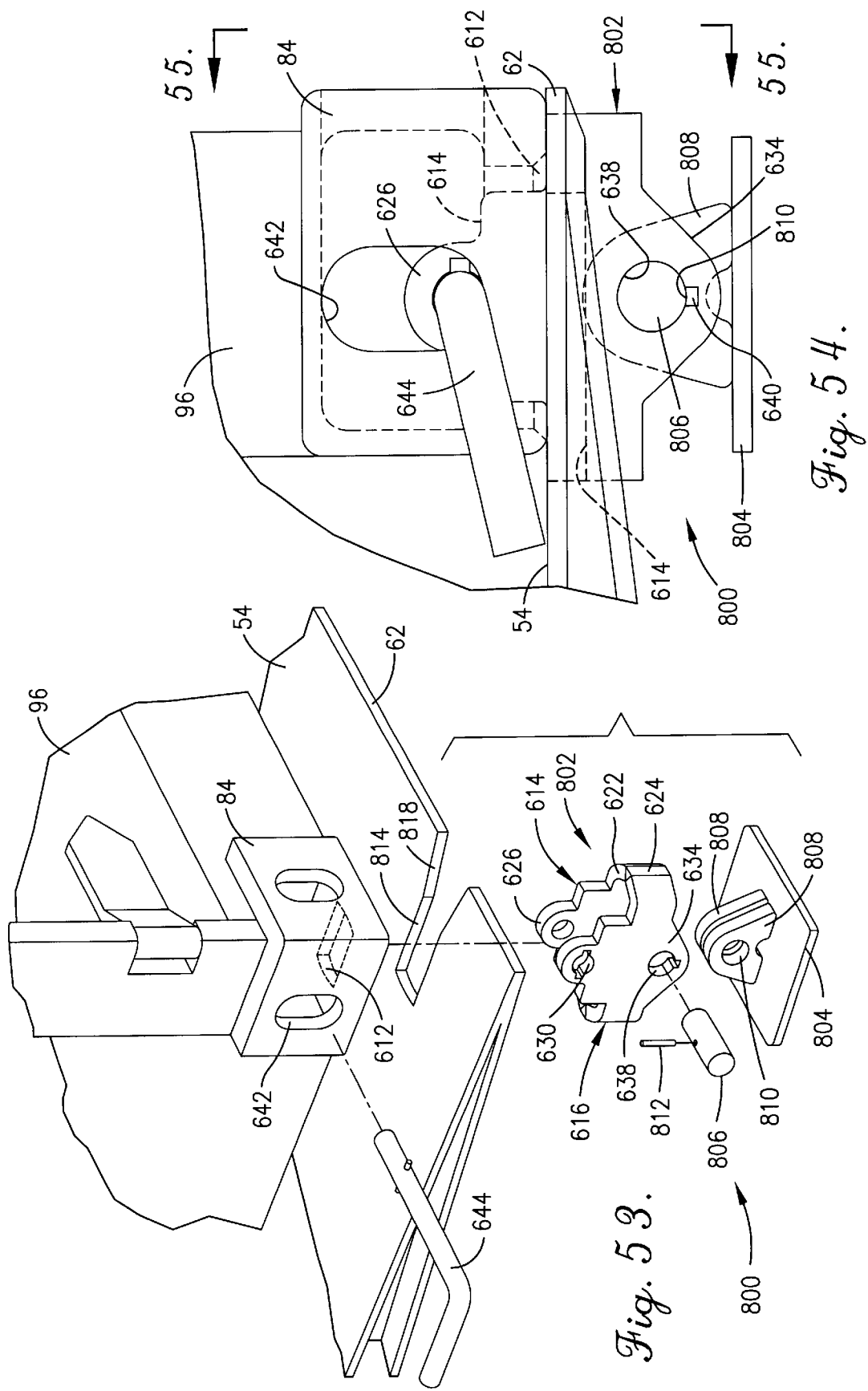

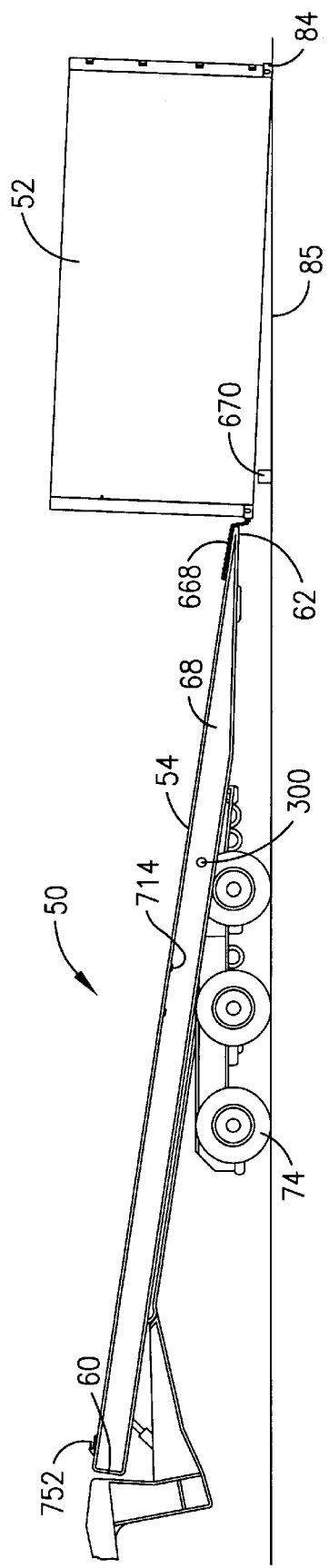
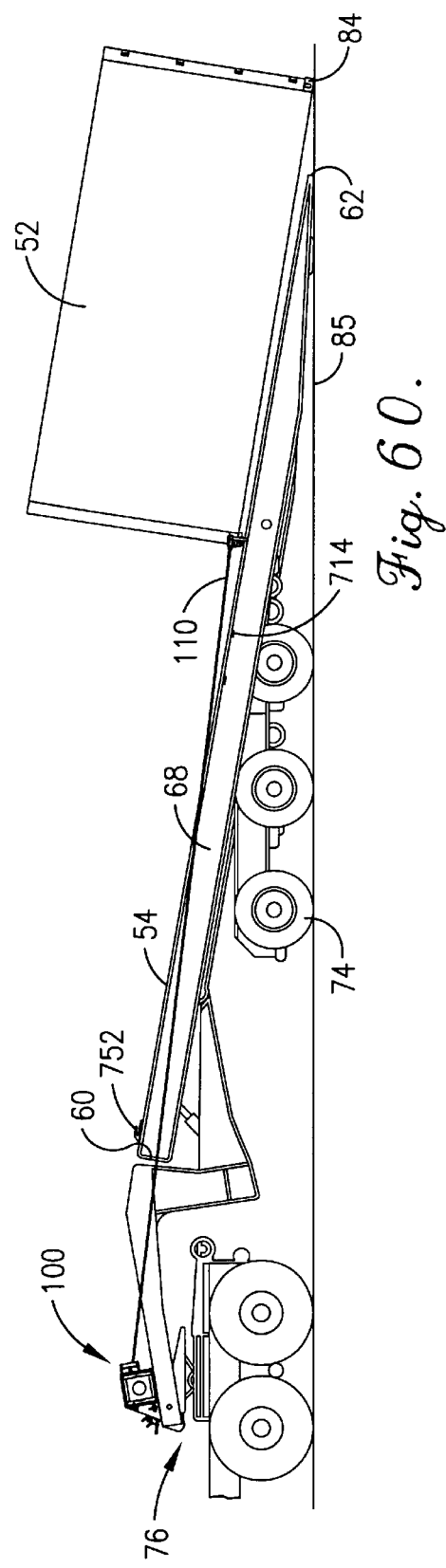

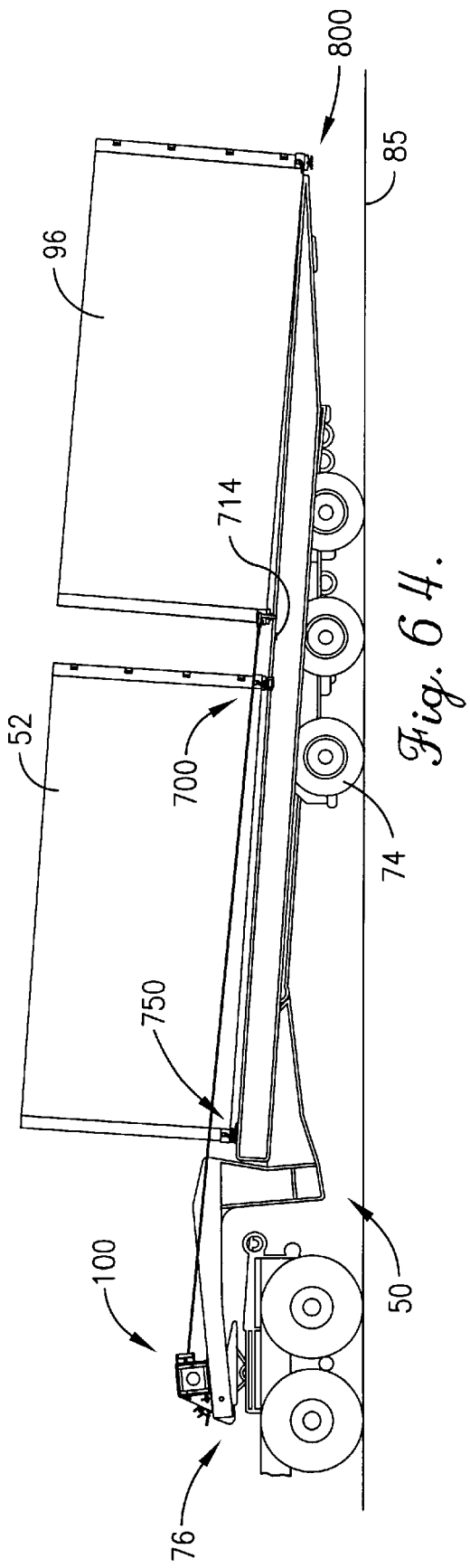
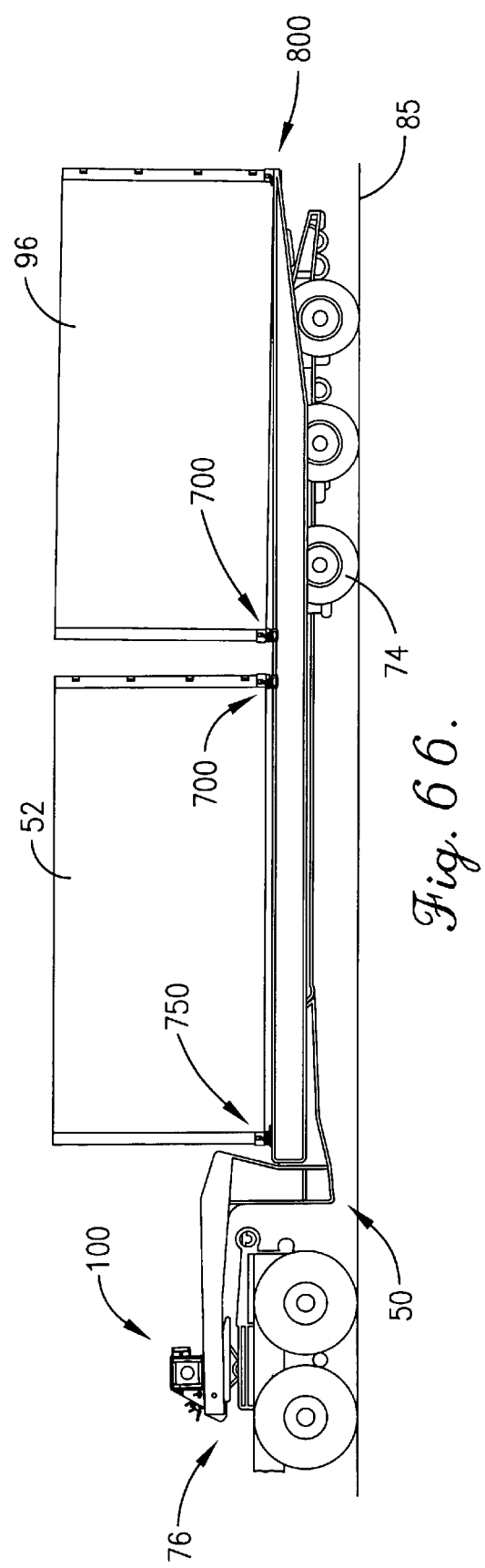

CONTAINER LOCKDOWN DEVICE

RELATED APPLICATIONS

This application is a continuation-in-part of and claims priority on previously filed and copending U.S. Application filed May 22, 1998 and having App. No. 09/084,126, now U.S. Pat. No. 6,126,378.

TECHNICAL FIELD

This invention relates to trailers and trailer accessories and, more particularly, to trailer and trailer accessories for loading, transporting, and off loading rectangular, International Standard Organization (ISO) containers having ISO corner fittings.

In preferred forms, this invention relates to container lockdown devices and wheel assemblies and, more particularly, to container lockdown devices which secure containers to trailers with the wheel assemblies attached to the trailers and methods for loading and unloading the containers therewith.

BACKGROUND

Containers constructed with dimensions according to the International Standards Organization (ISO containers) are commonly transported by tractor trailers. ISO containers typically come in lengths of twenty and forty feet, and each container has eight corners with each corner including a corner fitting. The corner fittings include an opening on each of the three exposed faces. Various components are attached to the corner fittings to lift, move, load, lockdown, and off-load the ISO containers. These components are generally bulky, complex, expensive to manufacture, and difficult to use requiring several people, or the addition of extensive equipment, to perform a task such as loading. Further, the ground surface over which containers are being loaded or off-loaded is sometimes damaged. It is also necessary during loading and unloading to remove and replace many of these components thereby increasing the labor required and time necessary to load and unload ISO containers. Further, the frequency of use and kinds of uses for ISO containers are continually increasing. For example, ISO containers are now used for anything from typical transportation and storage to mobile office space. Hence, the disadvantages of these components are becoming more acute and have a greater cost impact every day.

Trailer loading and off loading components are of special significance. Containers are frequently loaded onto trailers when oriented at an angle to the trailer. The various trailer accessories currently available lack the ability to align ISO containers with the trailer, so that loading and off loading are overly time consuming and require two or more people to complete the task. Conventionally, trailers are provided with a single winch fixed at a central location near the front of the trailer. The single winch lacks the ability to align the container during loading and is unable to aide in performing other functions such as off loading. Substantial advancements have been made in tilting trailers to load/unload containers by shifting the undercarriage of the trailer as taught by U.S. Pat. Nos. 5,211,413 and 5,013,056 and trailer side shifting for alignment to payload as taught by U.S. Pat. No. 4,746,261 which are hereby fully incorporated herein by reference. However, these references generally do not address alignment problems that occur while loading/unloading ISO containers from the trailer bed.

Another problem is presented when loading two twenty foot containers on the same trailer. When the front twenty foot container has been loaded onto a trailer, the centrally located winch is not positioned to efficiently pull the rear twenty foot container onto the trailer behind the front container.

When loading and unloading ISO containers without the aid of a crane, it is standard to attach wheel assemblies to the lower corners of the containers.

However, it is typically necessary to remove the wheel assemblies from the containers during transport. Wheel assembly removal is necessary because of their bulk and the space constraints on the trailers and because the wheel assemblies make it more difficult to safely and efficiently secure the ISO containers to the trailers.

SUMMARY OF THE INVENTION

Accordingly, one important object of the present invention is to provide an improved winch assembly having an increased ability to align containers as they are loaded.

It is an additional important object of the present invention to provide improved methods of loading and off loading containers which reduce time and labor for loading and off loading.

It is also an important object of the present invention to provide an improved wheel assembly for loading and moving containers.

It is also an important object of the present invention to provide an improved method for raising and lowering containers on wheel assemblies.

It is another important object of the present invention to provide improved off loading pulleys for use with a winch assembly to off-load containers.

It is still another important object of the present invention to provide an improved off-load foot for off loading containers.

It is a further important object of the present invention to provide an improved cable guide for aligning containers as they are loaded.

It is a still further important object of the present invention to provide improved container guides for aligning containers as they are loaded and off-loaded.

It is yet another important object of the present invention to provide an improved lockdown mechanism for holding containers in place after they are loaded.

In carrying out the foregoing and other objects, the present invention contemplates an improved trailer with an improved trailer winch assembly having a movable winch apparatus. A winch transport assembly operates to move the winch apparatus to a desired position, and a control mechanism is provided to operate the winch apparatus and control mechanism.

In a preferred embodiment, the winch transport assembly comprises an extendable arm with the winch apparatus attached to the winch arm adjacent an outer end of the winch arm. The winch arm is slidably received in a guide shell centrally located on the deck of the trailer. Preferably, a second winch apparatus is provided on a second winch arm slidably received in the guide shell to move the second winch assembly preferably in an opposite direction relative to the first winch assembly.

The present invention also contemplates an improved method for loading containers onto trailers. The winch apparatus is moved to a desired position, and a winch cable is connected to a front corner of the container. The winch apparatus is then activated to pull the deck under the container.

In a preferred embodiment, moving the winch apparatus comprises moving the winch apparatus beyond the side of the trailer deck. Also, a second winch apparatus is preferably moved by the transport assembly beyond the other side of the trailer deck. To load a second container, the winch cables of the two winch apparatus are connected to the front corners of the second container. With the winch apparatuses extended beyond the sides of the trailer deck, the cables extend beside the first container to pull the second container onto the trailer deck without interference from the first container. To further enhance the loading process, the trailer is initially rolled underneath the container which remains substantially stationary until it is almost entirely on the trailer.

The present invention further contemplates an improved wheel assembly for attachment to the corner fittings of ISO containers. The wheel assembly comprises a rigid wheel frame and a wheel rotatably and slidably supported in the wheel frame. The wheel frame slides between lowered and raised positions relative to the wheel, and an attachment assembly is utilized to attach the wheel frame to the corner fitting of the ISO container.

In a preferred embodiment, the wheel assembly includes a jack plate spaced apart from the wheel to define a jack receiving area between the wheel and the jack plate. The preferred embodiment also includes a lock block which is received into a lock slot of the wheel frame to hold the wheel frame in the raised position. The attachment assembly includes an attachment block onto which the wheel frame is slidably mounted for quick removal of the wheel frame from the attachment block.

The present invention still further contemplates an improved method for raising ISO containers with a jack and the wheel assembly. In the method, the jack is operatively positioned between the wheel and the jack plate, and the jack is activated to move the jack plate relative to the wheel. The lock block is then preferably inserted into the lock slot to hold the wheel in the raised position.

The present invention also contemplates an improved trailer including an inversion member. The winch cable extends around the inversion member and connects to the container to alter the pulling direction of the trailer winch apparatus. With the pulling direction of the winch apparatus changed, the winch apparatus operates to pull the container off the deck of the trailer.

In a preferred embodiment, the inversion member comprises a rotatable inversion pulley having a cable groove formed in its perimeter. Preferably, the inversion pulley is removably connected to a side flange of the deck and substantially inverts the pulling direction of the winch apparatus. The preferred embodiment further includes a second inversion member with the first and second inversion members being positioned at the same point along the length of the trailer. For unloading two twenty foot containers, third and fourth inversion members are preferably provided at a desired location along the length of the trailer different than the location along the length of the trailer for the first and second inversion members.

The present invention further contemplates an improved method for off loading containers from a trailer. In the method, the winch cable is extended around the inversion member, and the free end of the winch cable is removably attached to the container. The winch apparatus is then activated to pull the container off the deck of the trailer.

In a preferred embodiment utilizing two winch cables and where two twenty foot containers are located on the trailer, the winch cables are first extended around the first and second inversion members to off-load the rear container. Then the winch cables are extended around the third and forth inversion members to off-load the front container.

The present invention still further contemplates an improved off-load foot for use in loading an ISO container onto a trailer and in off loading an ISO container from a trailer. The off-load foot includes an attachment assembly for connection to a corner fitting of the ISO container, and a downwardly extending leg having an upper end connected to the attachment assembly and a ground end for engaging the ground surface.

In a preferred embodiment, the off-load foot also includes a base connected to the ground end of the leg. The edges of the base are turned up allowing the off-load foot to rock on the ground surface without damaging the ground surface.

The present invention also contemplates an improved method for off loading a container with the off-load foot. In the method, the off-load foot is attached to the corner fitting of the ISO container; the back end of the trailer is lowered until the ground end of the off-load foot securely contacts the ground surface lifting the end of the container off the back end of the trailer, and the trailer is pulled forward.

In a preferred embodiment, the back end of the trailer is lifted again, so that the off-load foot can be removed. After the off-load foot is removed, the back end of the trailer is lowered until the rear of the container contacts the ground surface, and then the trailer is pulled from underneath the container.

In another preferred embodiment, the preferred off-load foot is utilized during the last several feet of pulling a trailer with a cambered/arced deck under a 40 foot container, to keep from dragging the container bottom on the trailer. The rear of the trailer is lifted, and an off-load foot is attached to each rear corner of the container. The rear of the trailer is then lowered until the ground end of the off-load foot securely contacts the ground surface and lifts the rear of the container off the camber of the trailer. The trailer is then be pulled under the container to a loaded position.

The present invention also contemplates an improved cable guide in combination with a trailer having a winch apparatus and stake holes formed in the trailer deck. The roller guide includes a stake-hole post placed into one of the stake holes. With the stake-hole post in place, a guide portion of the cable guide is located above the deck and receives the winch cable to alter the pulling direction of the winch apparatus.

In a preferred embodiment, the guide portion is rotatably connected to the stake-hole post for rotation by the winch cable. Preferably, the guide portion is a circular disk with a cable receiving groove formed in its perimeter.

The present invention further contemplates an improved container guide for guiding and aligning a container especially during loading. The container guide includes an attachment mechanism for attaching a container guide body to the container and a winch cable attachment assembly for connecting a free end of the winch cable to the container guide body. The container guide also includes an elongated downwardly extending member having a length sufficient to extend below the surface of the deck and engage the sides of the deck.

In a preferred embodiment, the container guide body comprises two legs with one of the legs being the elongated member and the other leg having an aperture for attachment to a free end of the winch cable. Preferably, the elongated member also comprises an aperture for attachment to the free end of the winch cable, so that the container guide body is attachable in two configurations.

In another preferred embodiment, the attachment mechanism comprises a twist lock tab for locking in an opening of one of the corner fittings of the container. In this embodiment, the elongated member comprises a guide pin extending through a guide pin aperture in the container guide body. The pin is preferably cylindrical and rotatably received in the guide pin aperture.

The present invention still further contemplates an improved lockdown mechanism for holding a container on the trailer. The lockdown mechanism includes an attachment member for attaching to the container, a pivotal securement member for attaching to the deck and an extension member attached to both the attachment member and the securement member when the securement member is pivoted to a lockdown position. The securement member is preferably attached to an outer face of the side flange of the trailer deck, and the securement member preferably extends beyond the side flange to connect with the extension member. Thus, the extension member is positioned beyond the side flange of the deck.

In a preferred embodiment, the extension member comprises a substantially cylindrical pin extending through cylindrical openings in the attachment member and the securement member. Preferably, the extension member is substantially perpendicular to both the attachment member and the securement member. Further, a locking member is provided to hold the securement member in the lockdown position.

A further important object of the present invention is to provide an improved wheel assembly which can be attached to an ISO container during transport on a trailer.

It is another important object of the present invention to provide an improved lockdown mechanism which can secure an ISO container having wheel assemblies attached thereto during transport on a trailer.

It is still another important object of the present invention to provide an improved loading/off-loading container foot which can remain attached to an ISO container during transport on a trailer.

It is further an important object of the present invention to provide improved methods requiring less time and labor for loading and unloading ISO containers onto and off of trailers.

In carrying out the foregoing and other objects, the present invention contemplates an improved bottom wheel assembly for attachment to a container. The bottom wheel assembly includes a mounting bracket which attaches the assembly to the container, and at least one wheel rotatably connected to the mounting bracket. The mounting bracket and wheel, no matter which direction the container is moved, are always positioned below the container and inside of the extremities of the container.

In a preferred embodiment, the wheel comprises a non-castering wheel, and the mounting bracket comprises opposed components defining an upper pair of aligned lock pin openings and a lower pair of aligned wheel axle openings. The mounting bracket also has positioning shoulders sized to properly position the lock pin openings in an ISO container corner fitting. Preferably, the wheel assembly has three wheels and a lockdown extension extending from a wheel axle which extends through the wheel axle openings to mount the wheels to the mounting bracket. The wheel axle preferably includes a threaded lockdown extension and rounded lockdown extensions which cooperate with different lockdown brackets to secure the container to a trailer.

It is further contemplated that the described wheel assembly will be used in combination with a lockdown bracket, including a lockdown securement portion, and a trailer attachment portion. The lockdown securement portion attaches to the lockdown extension and to the trailer attachment portion thereby securing the container to the trailer.

In a preferred embodiment, the lockdown securement portion includes a lockdown flange defining an opening for receiving the lockdown extension therethrough and a threaded lockdown extension connector which is threadably connected to the threaded lockdown extension. The trailer attachment portion includes a pair of trailer clips attached to opposite ends of the lockdown flange and a central abutment block for fixed attachment to a trailer. The trailer clips are positioned on opposite sides of the central abutment block to secure the container to the trailer.

In another preferred embodiment, the lockdown securement portion comprises a pair of upper legs which receive the rounded lockdown extension between the upper legs and an upper surface of a trailer deck. Preferably, a pair of lower legs are positioned beneath the upper legs to hold the rounded lockdown extension between the upper and lower legs. The upper legs are somewhat movable, so that they are forced upwardly by the rounded lockdown extension as the rounded lockdown extension is forced into place between the upper and lower legs. The trailer attachment portion preferably comprises a stake hole connector attachable to a stake hole in the trailer deck. The stake hole connector includes a top plate mounted on top of the deck and a stake hole arm extending downwardly from the top plate through the stake hole. A bottom plate secures the stake hole arm in the stake hole.

The present invention further contemplates that the above described wheel assembly will be used in combination with a container. The container is preferably a rectangular ISO container having two front corner fittings and two rear corner fittings. It is further contemplated that the above described lockdown brackets will be used in combination with both the wheel assembly and the container.

It is still further contemplated in the present invention that the above described wheel assembly, container, and lockdown brackets will be used in combination with a trailer. The trailer preferably includes a trailer deck for supporting containers and a plurality of wheels rotatably coupled with the deck.

The invention is further directed to a novel lockdown mechanism for securing a container to a trailer. The mechanism includes a lockdown extension attachable to a container and a lockdown securement portion selectively connectable to the lockdown extension. A trailer attachment portion connects the lockdown securement portion to the trailer.

In a preferred embodiment, the lockdown extension comprises a wheel axle having a threaded front lockdown area and a rounded side lockdown area. In one preferred embodiment, the securement portion includes a lockdown flange and threaded lockdown extension connector as described above. The trailer attachment portion includes the above described clips and the central abutment block for fixed attachment to a trailer. Similarly, the trailer clips are positioned on opposite sides of the central abutment block to secure the container to the trailer.

In another preferred embodiment, the lockdown securement portion comprises the above described upper and lower legs which receive the rounded lockdown extension therebetween. The trailer attachment portion preferably comprises the above described stake hole connector attachable to a stake hole in the trailer deck.

The invention is further directed to a container foot having a substantially rigid foot mounting bracket for attachment to the container. A platform is pivotally attached to the foot mounting bracket.

In a preferred embodiment, the platform is a substantially flat, rectangular plate, and the foot mounting bracket and platform are positioned below the container and within the extremities of the container when attached to the container. The container foot is preferably used in combination with the container and a trailer having a deck that defines a container foot receiving slot having the foot mounting bracket held in the foot receiving slot. The foot receiving slot includes a widening mouth for guiding the foot mounting bracket into the container foot receiving slot, and the receiving slot is sized to securely hold the foot mounting bracket. With the foot mounting bracket securely held in the foot receiving slot, the container foot acts as a lockdown for the container.

The invention is still further directed to a novel mounting bracket for mounting various components onto a container. The mounting bracket includes a shoulder portion or mounting the bracket on the container and a substantially rigid attachment portion for having a selected one of a plurality components attached thereto.

In a preferred embodiment, the component is selected from a group comprising a container foot, a wheel assembly, and a lockdown extension. The attachment portion defines an opening having a key way, and one of the components includes a key received in the key way to fix that component from rotation. The shoulder is sized to properly position the mounting bracket relative to the container.

The invention is also directed to a novel trailer for transporting containers. The trailer includes a flat deck for supporting containers, and the deck has a front end, a back end, and opposed sides. A plurality of wheels are rotatably coupled with the deck and a hitch assembly is provided for hitching the deck to a towing vehicle. Preferably, the trailer also includes a pair of container foot receiving slots defined in the back end of the trailer. Additionally, the trailer preferably includes at least one of the above described lockdown brackets attached to the deck.

The invention also pertains to a method for loading containers on trailers. To load the containers, wheel assemblies are attached to two front corner fittings of the container and the container is pulled onto the trailer with a winch assembly. The wheel assemblies are left attached to the container, and the container is secured to the trailer with lockdown mechanisms for transport.

In a preferred embodiment, the method further comprises attaching container feet to the rear corner fittings of the container and inserting the container feet into container foot receiving slots formed in the back end of the trailer. For some containers, wheel assemblies are also attached to the two rear corner fittings of the container and left attached for transport. Preferably, securing the container to the trailer comprises connecting lockdown brackets to lockdown extensions of the wheel axles of the wheel assemblies.

BRIEF DESCRIPTION OF THE DRAWINGS

FIG. 2 is a fragmentary, enlarged perspective view of a front end of the trailer of FIG. 1;

FIG. 3 is a fragmentary, top plan view of a cable guide inserted in the trailer of FIG. 1 and illustrating the operation of the cable guide to align a container with the trailer;

FIG. 4 is a fragmentary perspective view of the cable guide of FIG. 3;

FIG. 5 is a fragmentary perspective view illustrating the operation of a container guide;

FIG. 6 is a fragmentary perspective view illustrating the operation of the cable guide of FIG. 3 and an alternate embodiment of a container guide;

FIG. 7 is a top view in partial cross-section of a winch assembly according to the present invention shown in an extended position;

FIG. 8 is a cable side view in partial cross section of the winch assembly of FIG. 7 shown in the extended position;

FIG. 14 is an exploded perspective view of a wheel assembly according to the present invention and the container guide of FIG. 5;

FIG. 15 is a partially exploded perspective view of the wheel assembly of FIG. 14;

FIG. 16 is an exploded perspective view of the alternate embodiment of the container guide assembly of FIG. 6;

FIG. 17 is a side view in partial cross section of the wheel assembly of FIG. 14 illustrating the wheel assembly in a lowered position and placement of a jack in the wheel assembly;

FIG. 18 is a front view in partial cross section of the wheel assembly of FIG. 14 in the lowered position;

FIG. 19 is a side view in partial cross section of the wheel assembly of FIG. 14 having a portion thereof removed to illustrate actuation of the jack and illustrating the wheel assembly in a raised position;

FIG. 20 is a front view in partial cross section of the wheel assembly of FIG. 14 in the raised position;

FIG. 21 is a side view of the wheel assembly of FIG. 14 and illustrating the container being loaded;

FIG. 22 is a side view of the wheel assembly of FIG. 14 and illustrating the operation of the container guide of FIG. 5;

FIG. 23 is a side view of the wheel assembly and container guide of FIG. 14 and illustrating a loaded position of the container;

FIG. 24 is a side view of a lockdown mechanism according to the present invention;

FIG. 25 is a horizontal cross sectional view of the lockdown mechanism of FIG. 24 taken along line 25—25 in FIG. 24;

FIG. 26 is a vertical cross sectional view of the lockdown mechanism of FIG. 24 taken along line 26—26 in FIG. 24;

FIG. 27 is a side view of the container guide of FIG. 6 illustrating the container being loaded;

FIG. 28 is a side view of the container guide of FIG. 6 illustrating the operation of the container guide;

FIG. 29 is a side view of the container guide of FIG. 6 illustrating the loaded position of the container;

FIG. 30 is a vertical cross sectional view of the container guide of FIG. 16 taken along line 30—30 in FIG. 29;

FIG. 31 is a vertical, transverse cross sectional view illustrating the container in a lockdown position;

FIG. 35 is a side view illustrating the trailer loading operation;

FIG. 36 is a side view illustrating a subsequent step in the trailer loading operation;

FIG. 37 is a side view illustrating a further subsequent step in the trailer loading operation;

FIG. 38 is a side view illustrating another subsequent step in the trailer loading operation;

FIG. 39 is a side view illustrating still another subsequent step in the trailer loading operation;

FIG. 40 is a side view illustrating a trailer loaded with two twenty foot containers;

FIG. 41 is a side view illustrating the trailer off-loading operation;

FIG. 42 is a side view illustrating a subsequent step in the trailer off-loading operation;

FIG. 43 is a side view illustrating an alternate trailer off-loading operation utilizing inversion pulleys shown in FIGS. 45 and 46;

FIG. 44 is a side view illustrating the trailer off-loading operation for a forty foot container;

FIG. 45 is a fragmentary side view illustrating the operation of an off-load inversion pulley according to the present invention;

FIG. 46 is a vertical cross section of the inversion pulley of FIG. 45 taken along line 46—46 in FIG. 45;

FIG. 50 is a side view of the wheel assembly of FIG. 47 and the intermediate lockdown mechanism of FIG. 47;

FIG. 51 is a vertical cross sectional view of the wheel assembly of FIG. 47 and the front lockdown mechanism of FIG. 48 taken along line 51—51 in FIG. 49;

FIG. 52 is a vertical cross sectional view of the wheel assembly of FIG. 47 and the intermediate lockdown mechanism of FIG. 47 taken along line 52—52 in FIG. 50;

FIG. 53 is an exploded perspective view of a pivoting container foot according to the present invention;

FIG. 54 is a side view of the pivoting container foot of FIG. 53 attached to an ISO container corner fitting;

FIG. 58 is a side view of the illustration in FIG. 57;

FIG. 60 is a side view illustrating a further subsequent step in the method for loading the container;

FIG. 64 is a side view illustrating a subsequent step in the method for loading the second container;

FIG. 66 is a side view illustrating a trailer loaded with two twenty foot ISO containers;

DETAILED DESCRIPTION

Introduction

Figure 1:
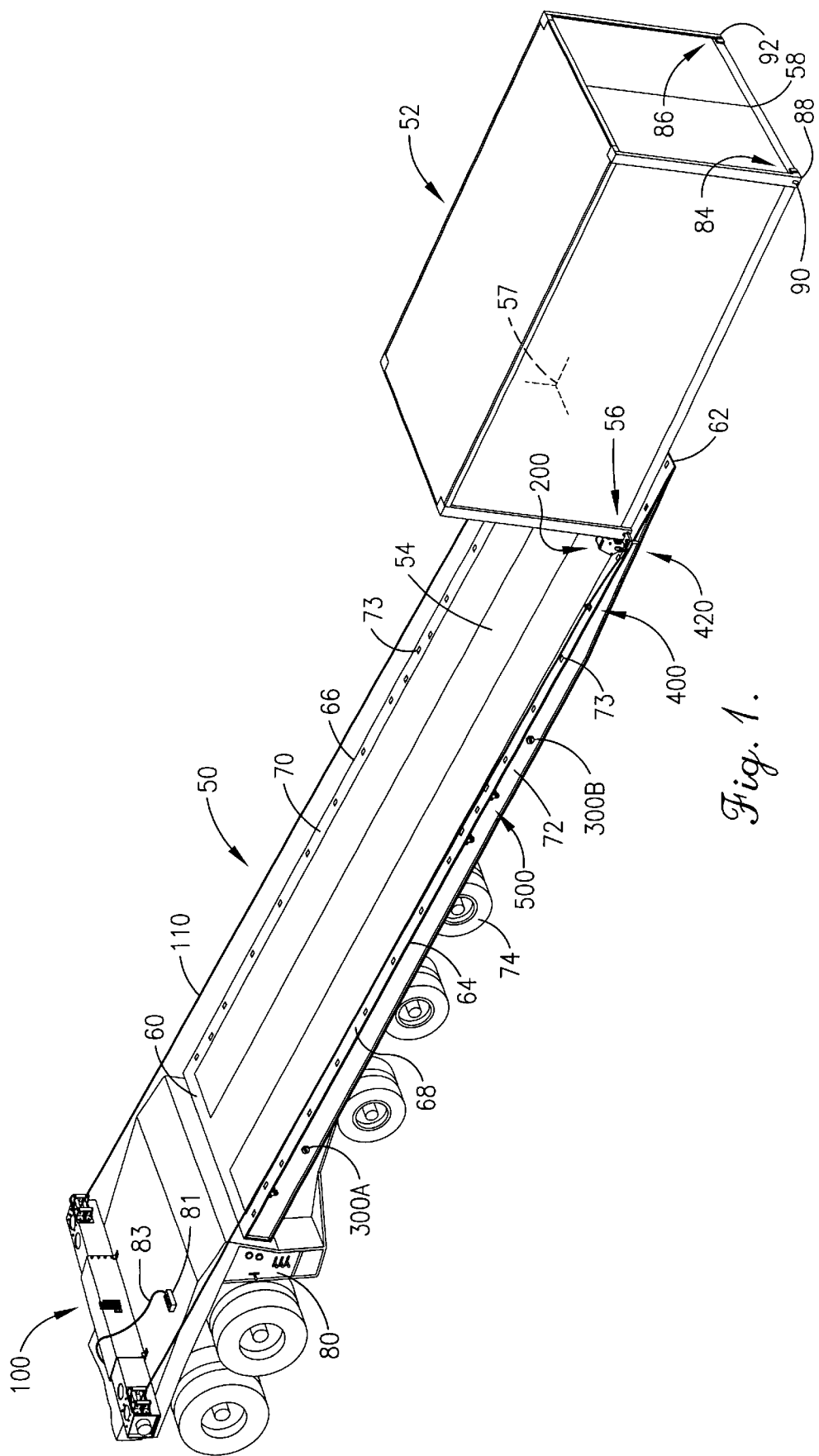
FIG. 1 is a perspective view of a trailer including features according to the present invention.
Figure 9:
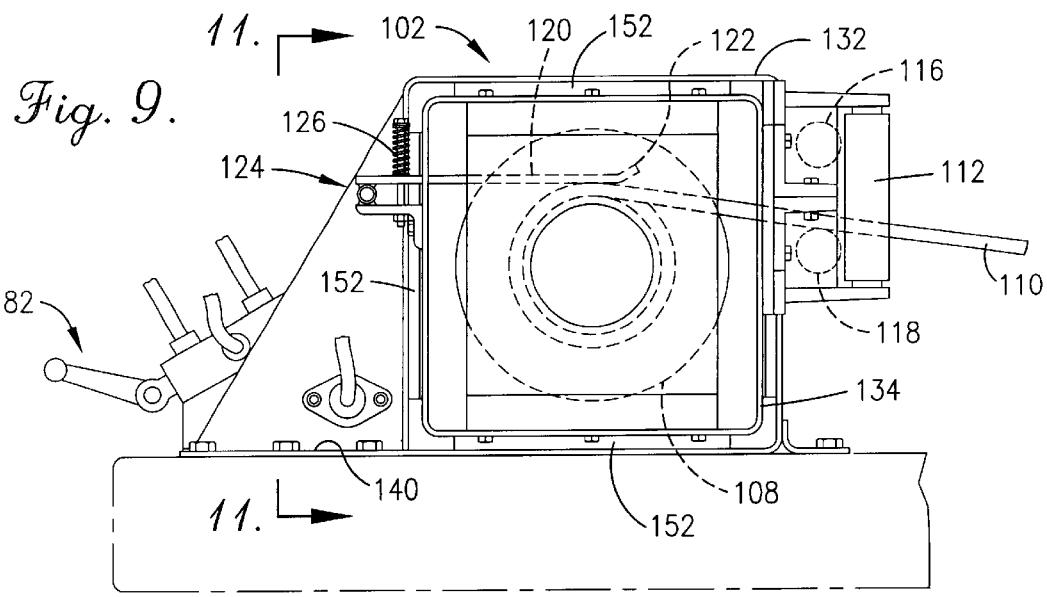
FIG. 9 is an end view of the winch assembly of FIG. 7 taken from the perspective of line 9—9 in FIG. 8.
Figure 10:
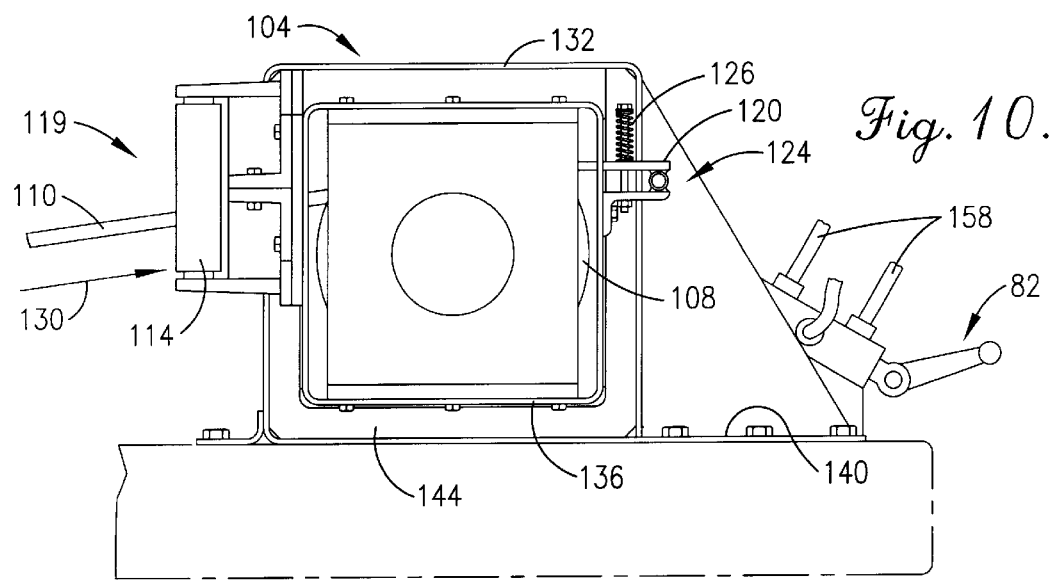
FIG. 10 is an opposite end view of the winch assembly of FIG. 7 taken from the perspective of line 10—10 in FIG. 8.
Figure 11:
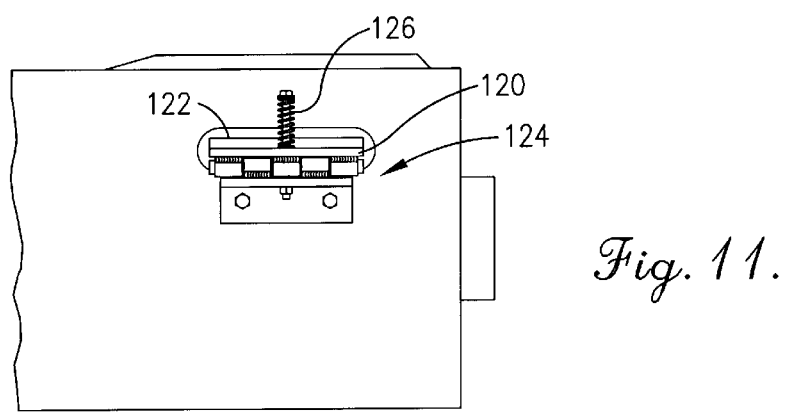
FIG. 11 is a fragmentary front view of the winch assembly of FIG. 7 taken from the perspective of line 11—11 in FIG. 9.
Figure 12:
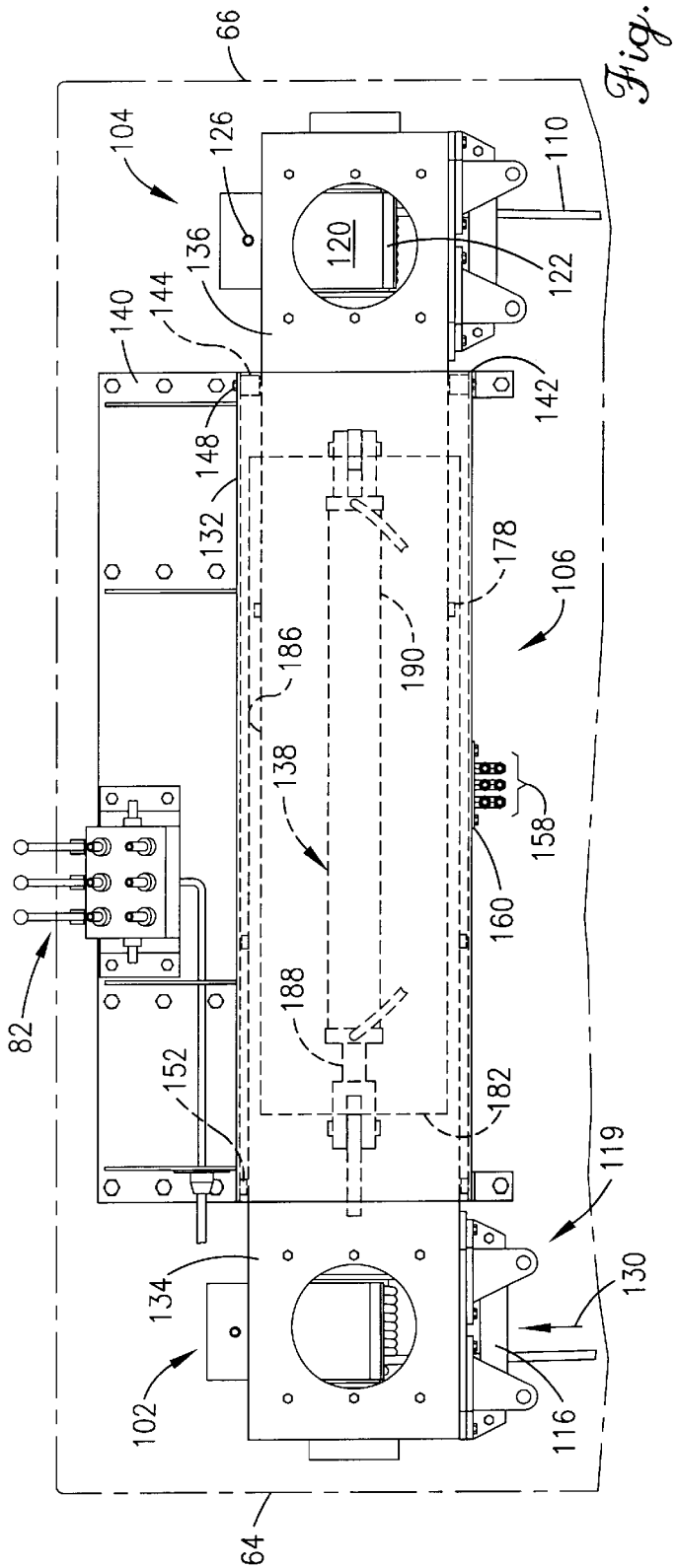
FIG. 12 is a top view of the winch assembly of FIG. 7 shown in a retracted position.
Figure 13:
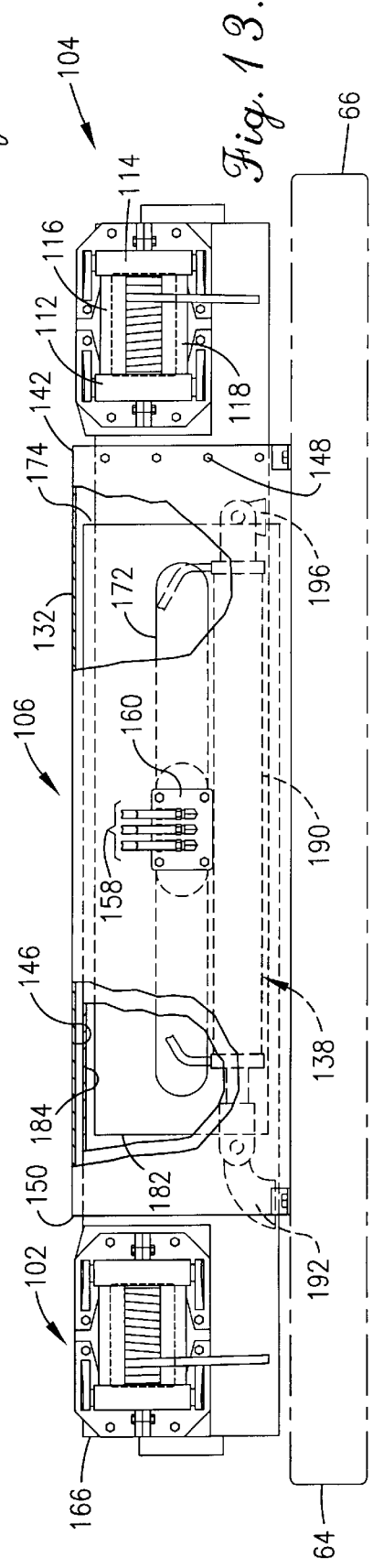
FIG. 13 is a cable side view of the winch assembly of FIG. 7 having portions removed for illustration and shown in the retracted position.

Referring to the drawings in greater detail, the trailer 50 shown in FIG. 1 includes a winch assembly 100 for loading an ISO container 52 onto the deck 54 of the trailer. Wheel mechanisms 200 are attached to at least the lower front corners 56, 57 of the container 52 allowing the trailer to roll under the container. The trailer 50 is also provided with inversion pulleys 300A, 300B for off loading the container, and an off-load foot 350 (FIG. 32) is provided for connection to the rear 58 of the container to aide in off loading. A cable guide 400 and a container guide 420 are provided to align the container during loading, and a lockdown mechanism 500 (FIG. 24) is provided to hold the container in place on the trailer.

Figure 47:
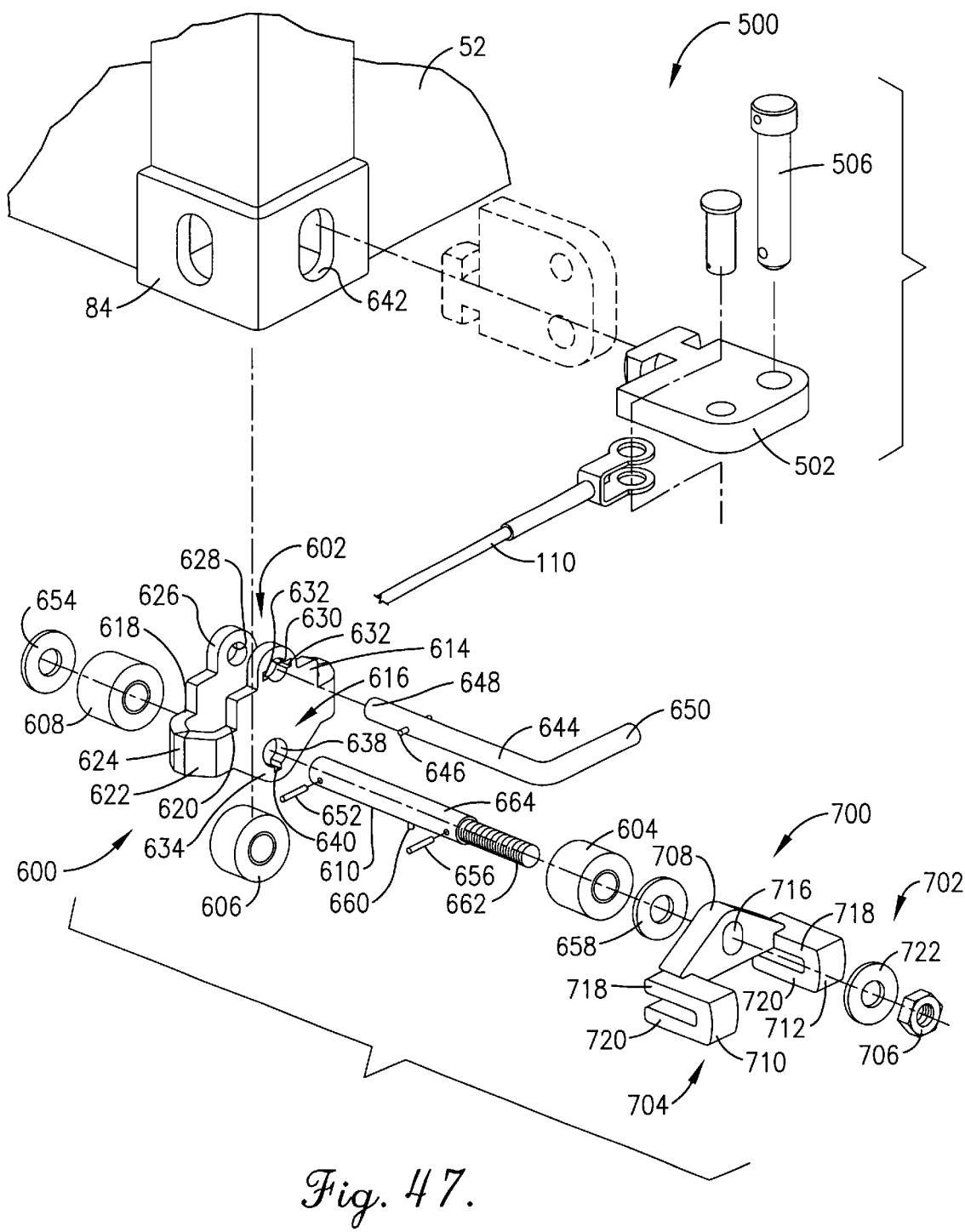
FIG. 47 is an exploded perspective view of a bottom wheel assembly according to the present invention, an intermediate lockdown mechanism according to the present invention, and the lockdown mechanism of FIG. 24.
Figure 48:
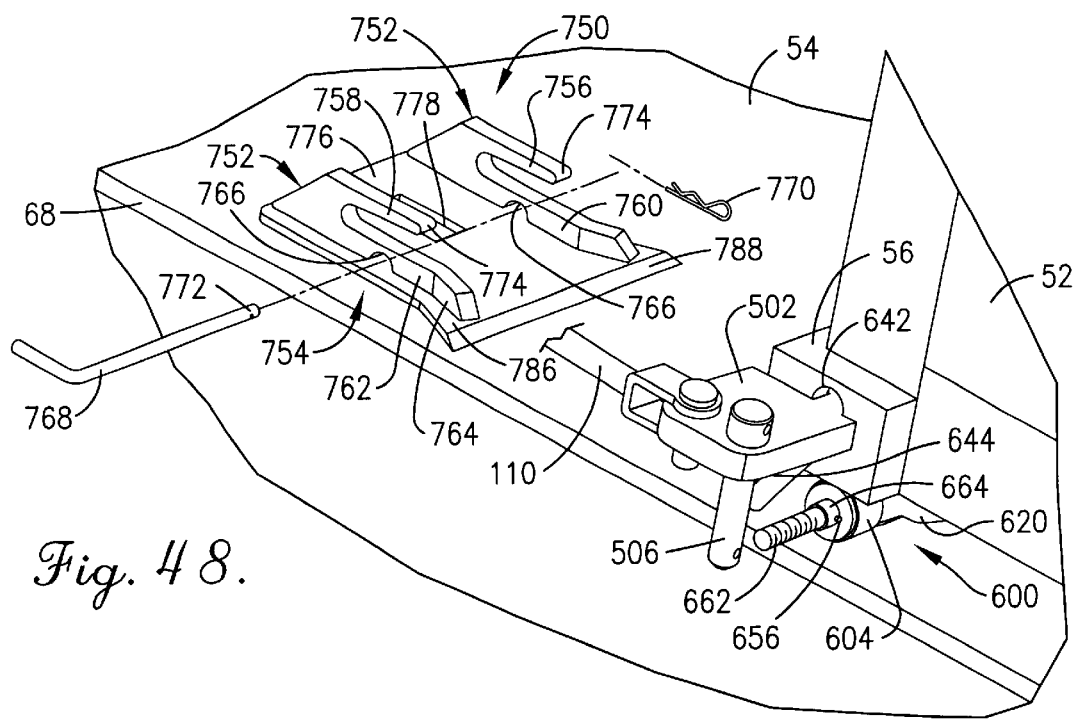
FIG. 48 is a perspective view of a front lockdown mechanism according to the present invention.
Figure 49:
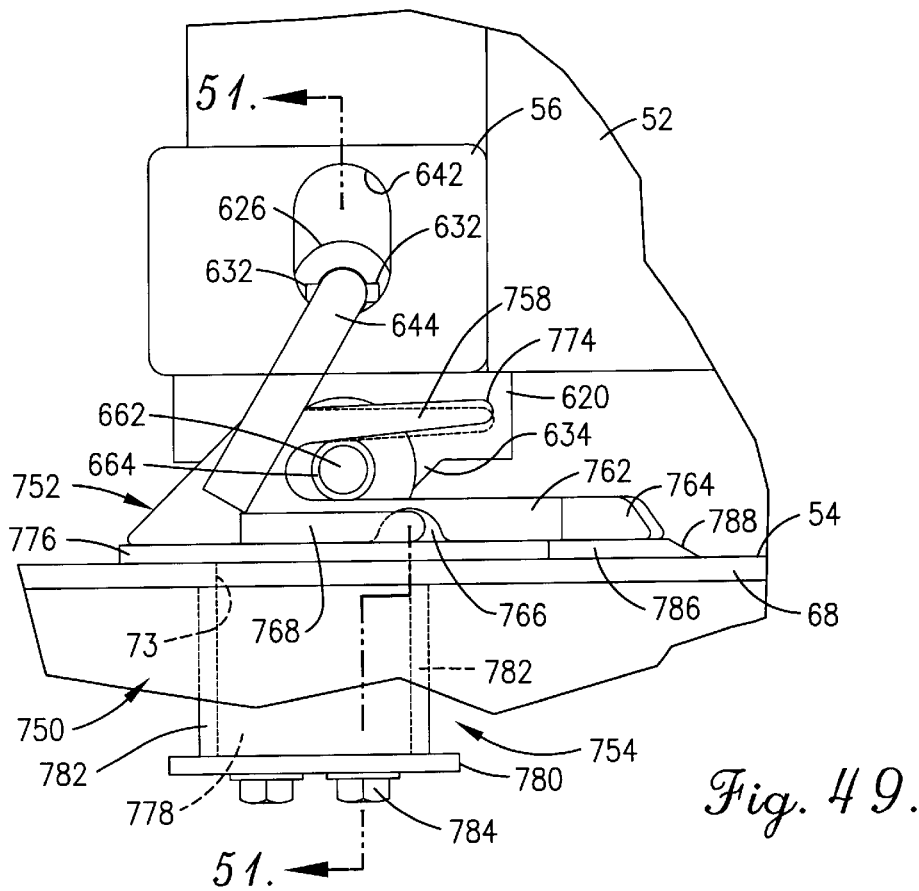
FIG. 49 is a side view of the wheel assembly of FIG. 47 and the front lockdown mechanism of FIG. 48.

FIG. 47 illustrates a bottom wheel assembly 600 and an intermediate lockdown mechanism 700. A front lockdown mechanism 750 is shown in FIGS. 48 and 49, and a pivoting container foot 800 is illustrated in FIG. 53. Utilizing the bottom wheel assembly 600 and the front and intermediate lockdown mechanisms, 700, 750 allows the containers to be transported on the trailer 50 with the bottom wheel assemblies 600 and container feet 800 attached to the containers 52, 96 (FIG. 39) thereby simplifying the loading and off-loading process.

Trailer and Container

Referring to FIGS. 1 and 2, the standard components of the trailer 50 will be described to the extent necessary for an understanding of the inventive features disclosed herein. The trailer includes a substantial flat deck 54 having a length extending between a front end 60 and a back end 62. The deck is substantially flat in that it has a small camber or arc from front 60 to back 62. The trailer also has a width extending between a first side 64 and a second side 66. Each side of the trailer has a side flange 68, 70 with an outer face 72 and a plurality of stake holes 73. The trailer also has a plurality of wheels 74 rotatably coupled with the deck 54 to support and transport the deck. The trailer also includes a hitch assembly 76 (FIG. 36) for connection to a towing vehicle 78 (FIG. 36). The hitch assembly is positioned adjacent to the front end of the deck, and the wheels are movable relative to the deck as taught in U.S. Pat. No. 5,211,413 and No. 5,013,056. A control mechanism 80, 82 operates to selectively control the functions of the trailer with the trailer control 80 raising and lowering the back end 62 of the trailer and the winch assembly control 82 (FIG. 7) for selectively activating the winch assembly 100. The winch assembly control 82 also includes a remote control 81 on a cable 83 that is long enough to extend to the back end 62 of the trailer 50. The trailer control 80, also includes a remote control (not shown) on a cable that is long enough to extend to the back of the trailer which is designed for operator safety.

The container 52 is an ISO container having opposed lower front corners 56, 57 and opposed lower rear corners 84, 86. Each corner is provided with a corner fitting 88, shown schematically in some drawings, having a slot shaped opening 90 with rounded ends on each of the three exposed faces 92. The container 52 is approximately twenty feet in length, and forty foot containers 94 (FIG. 44) are also provided. Thus, each ISO container has four lower corners with corner fittings for the attachment of components to load, off-load, and lockdown the container.

Winch Assembly and Operation

Referring to FIG. 2, the winch assembly 100 includes a first movable winch apparatus 102 and a second movable winch apparatus 104 operable to apply force to the container 52. The first and second winches are mounted on a transport assembly 106 that is centrally attached to the trailer near the front of the deck 54.

The two winches 102, 104 are adapted for left hand and right hand rotation and a re preferably hydraulic. The winches are otherwise substantially identical and will be described with reference to only one winch with identical reference numerals identifying the similar features of the winches. Referring additionally to FIGS. 7 through 13, the winch includes a cable spool 108 and a winch cable 110 which is wound around the cable spool. The winch cable extends from the winch apparatus through four roller guides 112, 114, 116, 118 on the cable side 119 of the winch assembly. The vertical roller guides 112, 114 restrict the movement of the cable in the horizontal direction and the horizontal roller guides 116, 118 restrict the movement of the cable in the vertical direction. The winch also includes a guide plate 120 having an upturned end 122 for progressively layering the cable as it is wound onto the spool 108. The plate 120 is hingably connected by a hinge connection 124 relative to the spool and is biased with a spring 126 against the cable. The winch can be released by the winch controls 82, so that the cable can be withdrawn from the winch and have its free end 128 (FIG. 16) attached to a desired component. The winch is activated to retract the cable 110 in a pulling direction, indicated by arrow 130, toward the winch and wind it on the spool 108.

The transport assembly 106 includes a guide shell 132, a first extendable winch arm 134, a second extendable winch arm 136, and an actuating member 138. The guide shell is rectangular, preferably substantially square, in cross section and is fixedly mounted on the trailer 50 with a mounting assembly 140 in a central location across the width of the trailer and adjacent to the front 60 of the deck 54 and the front of the trailer 50. A first end 142 of the guide shell includes a large stop 144 attached to the inner surface 146 of the guide shell with conventional fasteners 148. Preferably, the stop is U-shaped but can extend around the entire inside circumference of the guide shell. The stop 144 operates to center the second arm 136 in the guide shell. The second end 150 of the guide shell is provided with a small stop 152 which is preferably located on all four internal sides of the guide shell 132 and is split into four parts. A feed line opening 154 (FIG. 7) is formed in the cable side 119 of the guide shell to receive hydraulic lines 158 from the control mechanism 82. A mounting plate 160 is attached to the cable side 119 to hold the lines in place and permit the extendable winch arms 134, 136 to slide around the lines 158.

The first extendable arm 134 is also substantially square in cross section and is smaller than the guide shell, so that it is slidably received inside the guide shell. The first arm also has a stop 162 positioned on the outer surface 164 for engaging the small stop 152 of the guide shell thereby limiting the extension of the first arm 134. The stop is preferably bifurcated into two parts which are placed on the opposite sides of the first arm and extend across substantially the entire height of the first arm. The first winch 102 is fixedly attached inside the first arm adjacent to the outer end 166 of the first arm. The outer end 166 is adjacent the side 64 of the trailer. A cable opening 168 is formed in the cable side 119 through which the cable 110 extends. The roller guides 112–118 surround the opening and are fixedly mounted to the cable side 119 of the first arm 134. The cable side 119 of the first arm also includes a hydraulic line slot 172 through which the hydraulic lines 158 extend. The slot 172 is of sufficient length to allow the arm to fully extend and fully retract without the ends of the slot contacting the hydraulic lines. The inner end 174 of the first arm is opposite the outer end 166 and has a spacer 176 on the upper and lower outer surfaces. The spacer 176 is preferably bifurcated into two parts which extend across substantially the entire width of the first arm. The spacer 176, in cooperation with the stop 162, slides against the inner surface 146 of the guide shell to center the first arm inside the guide shell.

The second extendable arm 136 has features substantially identical to the first extendable arm which are identified by identical reference numerals. The second arm is substantially square in cross section and is smaller than the first arm, so that the second arm is slidably received inside the first arm. The first arm, second arm, and guide shell are all parallel. The second arm has a bifurcated stop 178 on the sides of the arm and a bifurcated spacer 180 (FIG. 8) adjacent to the inner end 182 of the second arm. The bifurcated stop 178 contacts the large stop 144 to limit extension of the second arm 136. The bifurcated spacer 180 engages the inner surface 184 of the first arm, and the large stop 144 of the guide shell engages the outer surface 186 of the second arm to center the second arm within the guide shell and within the first arm while allowing the second arm to slide relative thereto. The outer end 166 of the second arm is adjacent the other side 66 of the trailer.

The actuating member 138 preferably comprises a hydraulic cylinder. The hydraulic cylinder comprises an elongated piston 188 and an elongated cylinder housing 190 in which the piston is slidably received. The cylinder is housed inside of the first and second arms 134, 136 with the piston being attached to the lower portion of the inner surface 184 of the first arm with a fixed connection 192. The cylinder housing 190 is attached to the inner surface 194 of the second arm 136 with a fixed connection 196.

In operation, the winch control 82 is operated to extend the arms 134, 136 and attached winches 102, 104 in opposite directions away from the center of the trailer and away from each other until the winches extend beyond the respective sides 64, 66 of the deck 54. Thus, when a winch is moved, it is always moved away from one of the sides and preferably in a direction parallel to the width of the trailer.

Referring to FIGS. 38–40, in loading two twenty foot containers the winches are moved apart and the winch cables are first connected to the opposed front corners 56, 57 of the front container 52 and the winches are activated to pull the front container substantially all the way forward on the deck 54. The free ends of the cables are then removed from the opposed front corners 56, 57 of the front container 52 and are attached to the opposed front corners of the rear container 96. The winches are then activated again to pull the trailer under the rear container 96. The extendable winches allow the cables to extend on either side of the front container, so that the front container does not interfere with loading of the rear container 96. After the containers are loaded, the winch arms are retracted toward the center of the trailer, so that the winches are between the sides of the trailer.

Wheel Assembly and Operation

Referring to FIGS. 14 and 15, the wheel assembly 200 comprises a wheel frame 202, an attachment assembly 204, and a wheel 206. The wheel is rotatably mounted in the wheel frame 202, and the attachment assembly 204 attaches the wheel frame 202 to the corner fitting 88 of the container 52.

The wheel frame 202 comprises opposed vertical side walls 208, 210 joined by support rods 212, 214, a jack plate 216, and a rear plate 218. The opposed side walls are preferably parallel and have outward protrusions 220, 222 through which the front support rod 212 extends. The second support rod 214 is generally centrally located in the side walls and is positioned to center a jack 298 (FIG. 17) over the wheel 206. The jack plate 216 is positioned adjacent to the top ends of the side walls and is preferably oriented in a horizontal plane. The rear plate 218 is positioned adjacent to the top ends of the side walls at the rear of the side walls and it is preferably oriented in a vertical plane. The side walls 208, 210 also include slide tabs 224, 226 adjacent to the rear and bottom ends of the side walls. The slide tabs are generally rectangular and extend into the space between the two side walls. Preferably, the slide tabs 224, 226 are elongated in a vertical plane.

The wheel 206 which is preferably made of a hard metal, is rotatably and slidably mounted between the two side walls 208, 210 by a wheel shaft 228 extending through lock slots 230, 232 in the opposite side walls. The shaft 228 is secured with conventional fasteners 234 and washers 235 at each end of the shaft. A pair of lock blocks 236, 238 each have an aperture 240, 242 through which the shaft 228 extends. The lock blocks slide axially on the shaft, and the washers are sized to prevent the lock blocks from coming off the shaft. The lock blocks are preferably positioned outside of the side walls and are free to pivot around and slide on the shaft between the side walls and the washers. The lock blocks 236, 238 also include outer grasping portions 244, 246 which are sized so that they will not pass through the lock slots 230, 232. The lock blocks further include inner portions 248, 250 sized to fit into the lock slots with minimal clearance for hand insertion and removal. The inner portions together with the shaft fill the lock slots.

The attachment assembly 204 includes a fastener 252, an attachment block 254, and a locking member 256. The fastener comprises a threaded end 258 for threaded engagement with a nut 260 and an elongated head 262 sized to fit through the opening 91 in the corner fitting 88 when the fastener is held in the orientation shown. When the orientation of the fastener is rotated 90° it cannot pass through the opening 91 as illustrated in FIG. 25. A pin 265 is also preferably used to hold the fastener in place while the attachment block is being connected to the corner fitting 88. The pin extends through small openings 267, 269 in the attachment block and fastener respectively.

Referring additionally to FIG. 31, the attachment block 254 comprises an aperture 264 for receiving the fastener 252 and a recess 266 on its outer side 268 to receive the nut 260. The inner side 270 has a fastener head engagement collar 272 which keeps the fastener head from rotating during tightening. The collar 272 is generally U-shaped and includes upper and lower legs 274, 276 having flat inner faces 278, 280 for engaging the fastener head 262 and curved outer faces 282, 284 which fit between the fastener head and the ends of the opening 91 to fill the opening 91 whereby the attachment assembly 204 is substantially fixed from moving relative to the ISO container 52. Each leg also includes a chamfer 279, 281 for easier engagement with the fastener head 262.

The attachment block 254 also includes opposed outward facing slide channels 286, 288 which form a slide connection with the slide tabs 224, 226 allowing the wheel frame to slide up and down relative to the attachment block 254. The wheel frame 202 is held in place relative to the attachment block by the locking member 256 which extends through a pair of apertures 290 in the side walls and through a cylindrical hole 292 in an upper portion of the attachment block. The slide tabs and apertures 290 are all preferably aligned in the same vertical plane. A safety pin 296 is provided to prevent the locking member 256 from being inadvertently removed.

In operation and referring additionally to FIGS. 16–20, the attachment block 254 is fastened to the corner fitting 88 with the fastener 252, and the slide tabs 224, 226 are slid into the slide channels 286, 288. The locking member 256 is inserted through the pair of apertures 290 and the opening 292 to lock the wheel frame in place relative to both the attachment assembly and the container. The rear plate 218 abuts against the container 52 to stabilize the wheel assembly. At this point, the wheel is in the lowered position as shown in FIG. 17. A jack 298 is inserted into a jack receiving area 291 between the wheel 206 and the jack plate 216. The jack 298 includes a curved bottom 293 to engage the wheel 206 and a flat top 295 to engage the flat jack plate 216. The jack 298, which is preferably hydraulic, is then actuated to press the jack plate upwardly relative to the wheel to lift the wheel frame and container as illustrated in FIG. 19. The lock blocks are then manipulated to insert the inner portions 248 into the lock slots 230, 232 thereby locking the wheel in the raised position. The top 295 of the jack 298 is then retracted and the jack removed. Thus, a single jack can be used to place a container on wheels.

Using the wheel assembly 200 in the loading and unloading operation is described with reference to FIGS. 35–40. Wheel assemblies are attached to the opposed front corners 56, 57 of the container 52 and the winches 102, 104 are activated to initially draw the trailer underneath the front of the container while the container remains substantially stationary. When the container is almost entirely on the trailer, i.e., the back end of the trailer is within three or four feet of the rear 58 of the container, the trailer controls 80 are then operated to raise the back end 62 of the trailer 50, and wheel assemblies are attached to the opposed rear corners 84, 86 of the container. The back end of the trailer is then lowered again, and the winches are activated to pull the first container into place on the deck. The wheel frames are then removed from the attachment assemblies. The same procedure is repeated with the second container 96 or a forty foot container 94 with the exception that wheel assemblies are preferably not attached to the rear of the second container or of the forty foot container, so that the trailer is pulled underneath the container to load the container onto the trailer. If space permits, the wheel frames are left attached to the opposed front corners of the second container, and space permitting, preferably all of the attachment assemblies 204 are left on the containers.

In off loading the containers, the wheel frames are quickly reattached as described above to the attachment assemblies for off loading. After the containers are off-loaded, the attachment assemblies can then be removed from the corners of the ISO containers. As an alternative to the above loading operation, wheel assemblies could be attached to all four corners of the containers, and instead of the trailer being backed underneath the containers, the containers could be pulled up onto the trailer or some combination thereof.

Inversion Members and Operation

Referring to FIGS. 43–46, the trailer 50 is preferably provided with off-load pulleys 300 which act as inversion members to change the pulling direction 130 (FIG. 7) of the winches. The off-load pulleys 300 are operatively coupled with the container by a container attachment 302 and are rotatably mounted to the trailer with a trailer attachment 304.

The off-load pulleys 300 preferably comprise cylindrical disks. The perimeters 306 of the disks preferably define cable receiving grooves 308. Preferably, a first set of two pulleys 300A are positioned near to the front 60 of the deck 54, and a second set of two pulleys 300B are positioned near the center of the deck 54. Each pulley of the first set of pulleys 300A is positioned on opposite sides of the trailer at the same desired point along the length of the trailer approximately four feet from the front of the deck. The front pulleys are used to off-load a forty foot container as shown in FIG. 44 or off-load a front container. Each pulley of the second set of pulleys 300B are positioned on opposite sides of the trailer at the same desired point approximately four feet rearward from the center of the deck. The second set of pulleys can be used to off-load any container but are preferably used to off-load a rear twenty foot container.

For sake of brevity the off-load pulleys will be described with reference to only one pulley. The container attachment 302 preferably comprises one of the container guides 420 which will be discussed in detail below. The container attachment attaches the free end 128 of the cable 110 to the front corners 56, 57 of the container 52.

The trailer attachment 304 includes a shaft receptacle 310 welded to the side flange 68 of the deck 54. The shaft receptacle 310 receives a shaft 312 into a center aperture 320 and is locked in the shaft receptacle by a lock pin 314. The shaft 312 is fixed from rotation by the lock pin 314, so that the pulley rotates on a bushing 316 around the shaft 312. The pulley is attached to the shaft with a conventional fastener/washer assembly 318. Thus, the pulleys can be removed for transport or left attached in the shaft receptacle 310.

In operation, to unload a forty foot container 94, the winch cables 110 are wrapped around the first set of pulleys 300A and connected to the container attachment 302 at each front corner of the container as illustrated in FIG. 44. The winch is activated to pull the container rearwardly until the rear end of the container hangs far enough over the back end of the trailer, so that the rear of the container will not move while the tractor is driven from underneath the container.

To unload two twenty foot containers, the winch cables 110 are wrapped around the second set of pulleys 300B and the free ends 128 of the cables are attached to the front corners of the rear container 96 as shown in FIG. 43. The cables are held in the cable grooves 308 as the winches are activated to pull the container 96 rearwardly until it overhangs the back end of the trailer enough to be off-loaded. The cables are then disconnected from the rear container 96 wrapped around the first set of pulleys 300A and attached to the front corners of the front container 52. The winches are again activated pulling the container rearwardly. When the front of the container reaches the first set of pulleys 300A the winch cables are removed from the first set of pulleys and wrapped around the second set of pulleys to continue pulling the front container rearwardly until its rear end hangs over the back end of the trailer. If the winch cables have sufficient length they can be wrapped around the second set of pulleys initially. Thus, the pulleys operate to alter the pulling direction of the winches and preferably substantially invert the pulling direction of the winches, so that the power of the winches can be used to both load and off-load containers.

Off-Load Foot and Operation

Figure 32:
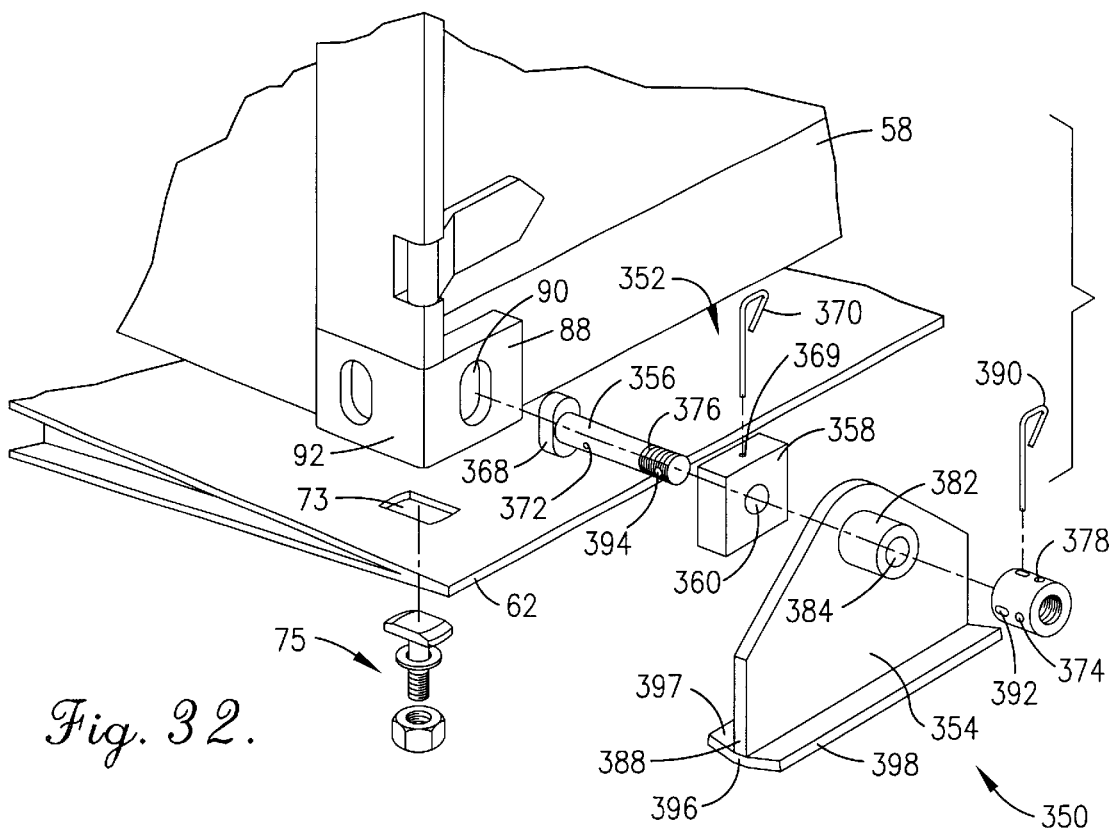
FIG. 32 is an exploded perspective view of an off-load foot according to the present invention.
Figure 33:
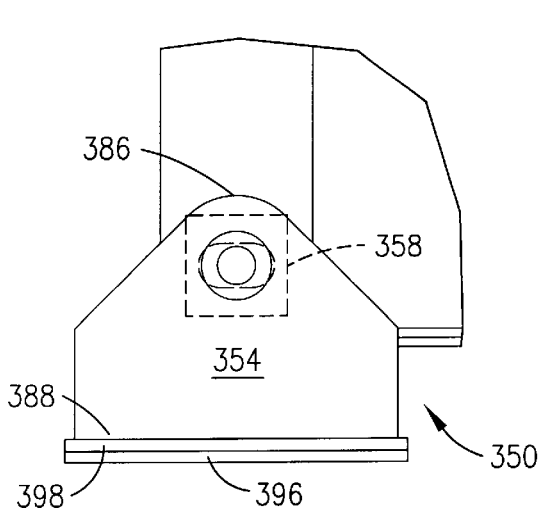
FIG. 33 is a rear view of the off-load foot of FIG. 32.
Figure 34:
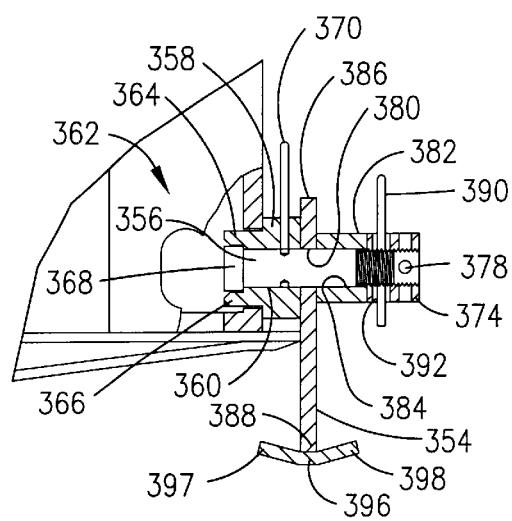
FIG. 34 is a vertical cross sectional view of the off-load foot of FIG. 32.

Referring to FIGS. 32–34, the off-load foot 350 includes an attachment assembly 352 for connection to a rear corner fitting of a container and a downwardly extending leg 354 connected to the attachment assembly. The downwardly extending leg 354 engages the ground surface 85 (FIG. 42) to aid in off loading containers.

The attachment assembly 352 comprises a fastener 356 for insertion into the opening 90 of the corner fitting 88 and an attachment block 358 having a central aperture 360 receiving the fastener therethrough. The block also includes a generally U-shaped fastener head engagement collar 362 which includes upper and lower legs 364, 366 for engaging the fastener head 368 and which fit between the fastener head and the ends of the opening 90 to fill the opening 90 whereby the attachment assembly 352 is substantially fixed from moving relative to the ISO container 52. The fastener 356, block 358, and collar 362 are substantially similar to and operate in substantially the same manner as those components provided on the attachment block of the wheel assembly.

The attachment block includes a pin hole 369 for receiving a pin 370 which extends through the pin hole and into an opening 372 in the fastener to hold the fastener and attachment block in place while the collar 374 is threaded onto a threaded end 376 of the fastener utilizing wrench holes 378 spaced around the circumference of the collar 374. To hold the tightened collar in place, a lock pin 390, preferably provided by transferring pin 370, is inserted through one of four collar lock slots 392 formed around the circumference of the collar and extends into an opening 394 in the threaded end 376 of the fastener 356.

The downwardly extending leg 354 includes an aperture 380 receiving the fastener therethrough and a cylindrical torsion resistance member 382 having a central aperture 384 concentric with the aperture 380 of the downwardly extending leg 354. The downwardly extending leg has an upper end 386 and a ground end 388 with the torsion resistance member 382 being attached adjacent to the upper end 386. The downwardly extending leg has a base 396 attached thereto having elongated upturned edges 397, 398. The upturned edges preferably extend across the entire length of the downwardly extending leg and allow the off-load foot to rock on top of the ground surface without damaging the ground surface.

In operation and referring to FIGS. 41 and 42, an off-load foot 350 is attached to each rear corner of the container, and the back end of the trailer is lowered until the base 396 contacts the ground surface 85 and lifts the rear end of the container off the back end of the trailer. The trailer is pulled forward out from underneath the container until there is approximately four feet of the container over hanging the back end of the trailer. This is a sufficient distance for the rear bottom edge of the container to securely engage the ground surface 85 without sliding. Preferably, the back end of the trailer is lifted again, and the off-load feet are removed. The trailer is then lowered and pulled forward the rest of the way out from underneath the container.

The off-load foot can also be utilized during the last several feet of pulling a trailer with a cambered/arced deck under, for example, a 40 foot container, to keep from dragging the container bottom on the trailer. The rear of the trailer is lifted, and an off-load foot is attached to each rear corner of the container. The rear of the trailer is then lowered until the ground end of the off-load foot securely contacts the ground surface and lifts the rear of the container off the camber of the trailer. The trailer can then be pulled under the container to a loaded position.

Cable Guides

Referring to FIGS. 3 through 6, the cable guide 400 is provided in combination with the trailer and includes a stake-hole post 402 and a guide portion 404 connected to a top end 406 of the stake-hole post. The stake-hole post is elongated and has a configuration and size, preferably two rods welded together, to fit snugly in a stake hole 73. The bottom end 412 of the stake-hole post is inserted into the stake hole. The guide portion 404 preferably comprises a cylindrical disk having a cable groove 408 formed in its perimeter. The disk is preferably rotatably secured to the stake-hole post with a fastener/washer assembly 410.

In operation, the cable guide 400 is used to align a container 53 that is out of alignment with the deck 54. The cable guide is capable of aligning the container 53 if the container is oriented at an angle with the deck or positioned to one side of the deck as shown in FIG. 3. The cable guide 400 is inserted into a desired stake hole along the length of the trailer. The cable 110 is positioned in the cable groove 408. The winches are activated pulling the container toward the deck and aligning the container with the deck. The cable guide can be moved from one stake hole to another to better achieve alignment, and cable guides can be used on both sides of the trailer. As the cable is pulled past the cable guide, the guide portion 404 rotates, so that the cable moves smoothly past the cable guide. The cable guide operates to alter the pulling direction of the winches, as desired, enough to align the container with the trailer.

Container Guides

Two embodiments of the container guides 420A, 420B are shown in FIGS. 14 and 16. The embodiment shown in FIG. 14 will be discussed first. The container guide 420A comprises a container guide body 422, an attachment mechanism 424 for attaching the container guide body to the container, a winch cable attachment assembly 426, and a elongated downwardly extending member 428.

The container guide body 422 is preferably a flat plate having a first aperture 430 for attachment to the cable and a second guide pin aperture 432 to receive the downwardly extending member 428. The apertures are approximately the same size, so that the cable can be attached to the rearward second aperture, or an added third aperture, for off loading containers with the inversion pulleys 300. The container guide body also has an attachment mechanism leg 434 connecting the container guide body to the attachment mechanism 424.

The attachment mechanism 424 comprises a twist lock tab 436 integral to the attachment leg 434 for connection to the corner fitting of the container. When the attachment leg 434 is vertically oriented as shown in phantom lines, it fits into the opening 90 of the corner fitting. The container body and attachment tab have been rotated ninety degrees to lock the attachment tab in the corner fitting. The twist lock tab 436 allows the container guide body 422 to pivot relative to the container. The degree of pivot is controlled by the pulling angle of the cable.

The winch cable attachment assembly 426 comprises a U-shaped cable termination 438 attached to the free end of the winch cable 110. Each leg 440, 442 comprises an aperture 444, 446 for alignment with the preferably circular aperture 430 in the container body, and the legs are spaced far enough apart to receive the container body therebetween. A lock member 448, preferably a cylindrical pin, extends through the apertures 430, 444, 446 to connect the free end 128 of the cable to the container guide body 422 and a safety pin 450 (FIG. 16) is inserted through an opening 452 in the bottom of the lock cylinder 448 to prevent unintentional removal.

The downwardly extending member 428 preferably comprises a cylindrical pin extending through the preferably circular aperture 432 in the container guide body. The member 428 includes an enlarged head 454 which prevents it from falling through the aperture 432. The downwardly extending member has a length sufficient to extend below a top surface of the deck, and the container guide body extends away from the container a sufficient distance for the downwardly extending member to be positioned beyond the side of the trailer.

In operation and with reference to FIGS. 21–23, the container guide body is connected to the corner fitting and the winch cable is connected to the container guide body. The winches are activated to start pulling the trailer underneath the container and when the container is far enough on to the deck 54, the elongated member 428 is dropped into the aperture 432 to hold the container in alignment with the deck 54. If the container is being pulled all the way to the front of the deck, a container guide is preferably attached to both the front and rear corners of the container. As the container is moved relative to the deck 54, the elongated member 428 contacts the sides 64, 66 of the deck. The elongated member 428, slides against the sides of the deck and preferably rotates in the aperture 432 to roll against the sides of the deck.

The container guide can be used in conjunction with the cable guides by placing the container guide on the corners and pulling the container towards the trailer until the elongated member 428 contacts the side of the container. The container guide then keeps the container from moving past the aligned position. This is particularly effective for correcting angular misalignments between the trailer and container.

Referring to FIGS. 16 and 30, the second embodiment of the container guide 420B includes a container guide body 456, an attachment mechanism 458 for attaching the container guide body to the container, a winch cable attachment assembly 460, and a elongated downwardly extending member 462. The winch cable attachment assembly 460 is substantially identical to the winch cable attachment assembly 426 of the prior embodiment and will not be described again.

The container guide body includes two legs 464, 466 spaced at an angle of approximately 90°. The first leg 464 comprises a short leg having an aperture 468 for attachment to the winch cable. The second leg 466 comprises a long leg which operates as the elongated member 462 and includes an aperture 470 for attachment to the winch cable 110. An extension sleeve 484 is attached to an inner side 488 (FIG. 30) of the body 456, so that the body is positioned beyond the side of the trailer. The edges of the body 456 have a chamfer 486 (FIG. 30) for engaging the side of the trailer. The container guide body 456 also includes a fastener aperture 472 at its pivot corner 474, so that the body 456 is attachable in two configurations. In one, the elongated member is substantially parallel to the deck and in the other, the elongated member extends below the top surface of the deck to engage the sides of the deck.

The attachment mechanism comprises a fastener 476, attachment block 478, collar 480, and safety pin 482 which are substantially identical to the similar components described in conjunction with the off-load foot. Thus, these components will not be described again.

In operation and referring to FIGS. 27–30, the cable is first attached to the aperture 470 in the long leg 466, and the trailer is pulled underneath the container until the front of the container is elevated enough over the ground surface 85, so that the elongated member 462 can be extended downwardly without contacting the ground surface. The cable is then removed from the long leg aperture 470; the container body 456 is pivoted on the fastener around the pivot corner 474 until the long leg 466 extends downwardly, and the cable is attached to the short leg aperture 468 to continue pulling the trailer underneath the container. The elongated member 462 contacts the sides of the trailer and operates to align the container and keep the container in alignment during loading.

Lockdown Mechanism

Referring to FIGS. 23–26, the lockdown mechanism 500 includes an attachment member 502 for attaching to the container, a pivotal securement member 504 for attaching to the deck, and an extension member 506. The attachment member 502 preferably comprises the container guide body 422 of the first embodiment of the container guide 420A incorporating a twist lock tab 507 for quick connection and disconnection to the corner fitting. The attachment member 502 also includes an extension member aperture 508 and a cable connection aperture 510.

The pivotal securement member 504 comprises a pair of generally rectangular tabs 512, 514 on opposite sides of the securement member. The securement members are preferably attached to the first and second outer faces 72 of each side flange 68, 70 so that there are a total of six securement members in locations corresponding to the four corners of a loaded front container 52 and to the two front corners of a rear container 96. The tabs are received in weldment brackets 516, 518 which define openings 522 between the brackets and the side flange 68 allowing the rectangular tabs 512, 514 to be pivoted therein between a lockdown position (FIG. 24) and a disconnected position (FIG. 23). The rectangular tabs 512, 514 also include a pivot chamfer 520 which provides further freedom in pivoting the tabs inside the openings 522. The pivotal securement member also includes an extension member opening 524 near its movable end 526.

The extension member 506 is preferably provided by the downwardly extending member 428 of the first embodiment of the container guide 420A. The extension member 506 is preferably cylindrical having an enlarged cylindrical head 528 to prevent it from passing through the extension member aperture 508. The lower end 530 of the extension member has an opening 532 to receive a lock pin 534 which prevents the securement member and the extension member from inadvertently disconnecting. Once connected, the extension member 506 is substantially perpendicular to the securement and attachment members which are substantially parallel to each other.

In operation, the container is moved to the location shown in FIG. 23 and the extension member 506 is lifted partially out of the extension aperture 508. The securement member 504 is pivoted upwardly toward the extension member until it is substantially parallel with the attachment member 502. The extension member is then inserted through the aperture 524 in the securement member 504, and the lock pin 534 is inserted through the opening 532 in the extension member. This lockdown mechanism replaces the conventional lockdown mechanism 75 shown in FIG. 32 which is still preferably used at the back end 62 of the deck. The improved lockdown mechanism 500 is easier to attach and remove and thus is preferably used at all container corners on both sides of the trailer. Because at least one, but preferably both, of the attachment member and the securement member extend far enough so that the apertures 524, 508 are positioned beyond the side flange, the extension member is positioned beyond the side of the trailer, and the lockdown mechanism is accessible from beside the deck.

The features of the disclosed self-contained trailer significantly simplify the loading and off-loading operations. The features allow a single person to load and off-load containers. Further, these features allow containers to be more easily loaded from angled and misaligned orientations.

Bottom Wheel Assembly and Operation

Referring to FIGS. 47, 51, and 52, the bottom wheel assembly 600 includes a mounting bracket 602, and a plurality of non-castering wheels 604, 606, 608 rotatably mounted on a wheel axle 610. The mounting bracket 602 is mounted in the bottom hole 612 of a rear ISO container corner fitting 84 (56-front corner fitting). The mounting bracket 602 and wheels 604–608 are positioned below the container and stay within the extremities of the container 52 when attached no matter which direction the container is being moved.

The mounting bracket 602 includes a substantially rigid shoulder portion 614 and a substantially rigid attachment portion 616 formed by two opposed components 618, 620. The two opposed components, which have substantially the same outlines, include an inside component 618 and an outside component 620 spaced apart from the inside component. To achieve the spacing, each of the components include curved ends 622. The opposed pairs of curved ends are fixedly connected by weld connections 624.

The shoulder portion 614 is substantially rectangular with upwardly extending and rounded tabs 626 which define an upper pair of aligned lock pin openings 628, 630. The inside lock pin opening 628 is substantially circular, and the outside lock pin opening 630 is also substantially circular and includes opposed rectangular openings 632. The attachment portion 616 is generally rectangular with generally triangular tabs 634 extending downwardly. The attachment portion 616 defines a lower pair of aligned wheel axle openings 636, 638. The inside wheel axle opening 636 is substantially circular, and the outside wheel axle opening 638 is also substantially circular and includes a downwardly extending rectangular key way 640.

The shoulder portion 614 is sized to inhibit the mounting bracket 602 from sliding in the bottom hole 612 and to properly position the lock pin openings 628, 630 in the front ISO container corner fitting 56 (84-rear corner fitting), so that the lock pin openings 628, 630 are aligned with the base of the side hole 642 of the ISO container corner fitting 56. A lock pin 644 is inserted through the side hole 642 of the ISO container corner fitting 56 and through the lock pin openings 628, 630. The lock pin openings are positioned to inhibit relative vertical movement between the mounting bracket 602 and the corner fitting 56. The lock pin 644 includes an inward key pin 646 which passes through the rectangular openings 632 in the outside lock pin opening 630. When the lock pin 644 is rotated, the inward key pin 646 locks the lock pin in position thereby mounting the mounting bracket 602 onto the corner fitting 56. The inward key pin is positioned along the length of the lock pin so that the inner end 648 of the lock pin 644 cannot be removed from the inside lock pin opening 628 without aligning the inside key pin 646 with the rectangular openings 632 in the outside lock pin opening 630. In one embodiment the lock pin 644 also includes an outward key pin (not shown) positioned adjacent to the handle 650 of the lock pin 644.

The wheel axle 610 is cylindrical and extends through the wheel axle openings 636, 638. The central wheel 606 is rotatably held on the wheel axle 610 and positioned between the inside and outside components 618, 620 of the mounting bracket 602. The inside wheel 608 is rotatably mounted on the wheel axle and is positioned outside of the mounting bracket and adjacent the inside component 618. The inside wheel 608 is held on the wheel axle by an inside wheel attachment pin 652 which engages an inside wheel washer 654 also mounted on the wheel axle next to and outside of the inside wheel 608.

The outside wheel 604 is rotatably mounted on a wheel axle 610 and is positioned outside of the mounting bracket and adjacent the outside component 620. The outside wheel 604 is held on the wheel axle by an outside wheel axle attachment pin 656 which engages an outside wheel washer 658. The outside wheel washer 658 is mounted on the wheel axle next to and outside of the outside wheel 604.

The wheel axle also includes an axle key 660. The axle key is positioned along the length of the wheel axle, so that it extends into the key way 640 formed in the outside wheel axle opening 638. Thus, the axle key 660 substantially prevents the wheel axle from rotating. The wheel axle also includes a threaded lockdown extension 662 and at least one but preferably a pair of rounded lockdown extensions 664 extending from opposite ends of the wheel axle. For purposes of definition, the lockdown extensions 662, 664 are not included in the bottom wheel assembly 600. The threaded lockdown extension 662 cooperates with and forms a part of the intermediate lockdown mechanism 700 as described below. Thus, the threaded lockdown extension 662 forms an intermediate lockdown area of the lockdown extension which is attached to the container by the mounting bracket 602. The rounded lockdown extensions 664 cooperates with and forms a part of the front lockdown mechanism 750 as described below. Thus, the rounded lockdown extensions 664 forms a front lockdown area of the lockdown extension which is also attached to the container by the mounting bracket, so that the lockdown extensions extend from the mounting bracket 602.

In operation and with reference to FIGS. 56 through 59, two bottom wheel assemblies 600 are attached to the lower front corner fittings 56, 57 of the container 52 by lifting the container with the back end 62 of the trailer 50. Specifically, chains 668 are hooked into chain hook holes 669, "gotchas" located in the approach plate at the rear of the trailer and attached to the front corner fittings, and the back end of the trailer is raised lifting the container off the ground. Blocks 670 are positioned underneath the container and the container is lowered onto the blocks. With the container supported on the blocks, the chains 668 are removed and the wheel assemblies are attached by inserting the positioning shoulder 614 of each mounting bracket inside the bottom holes 612. The lock pins 644 are then inserted into the lock pin openings 628, 630 mounting the wheel assemblies onto the bottom of the container. The back end 62 of the trailer is then positioned underneath the wheel assemblies and the front of the container is lifted off of the blocks 670. The blocks are then removed, and the back end 62 of the trailer 50 is lowered to pull the trailer under the container keeping the back end 62 of the trailer off the ground 85. The wheel assembly and the mounting brackets are sized and positioned so that they are contained within the extremities of the container, and even with the lock pins 644 in place, there is still room for the attachment member 502 of the lockdown mechanism 500 to be held in the side opening 642 of the corner fitting.

Figure 67:
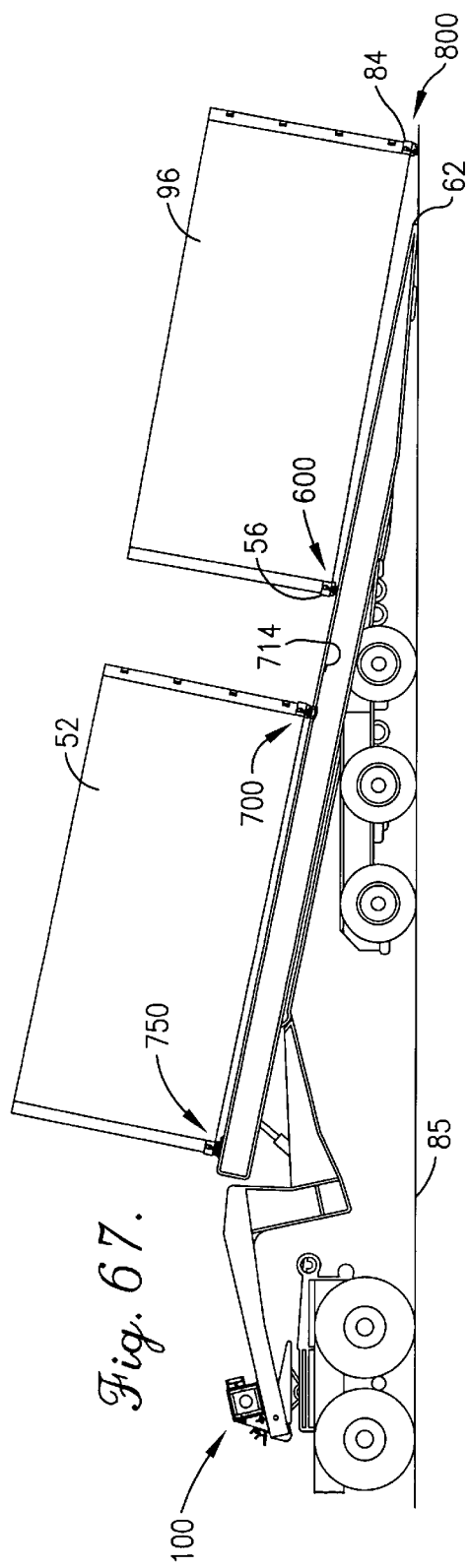
FIG. 67 is side view illustrating a step in a method for unloading containers.
Figure 68:
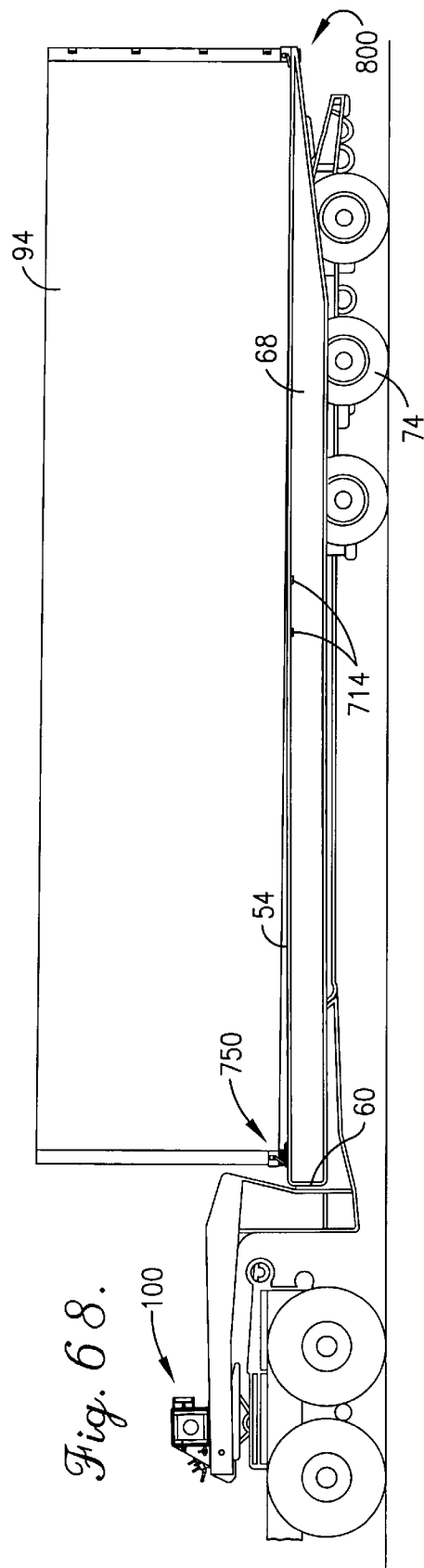
FIG. 68 is a side view illustrating a trailer loaded with a forty foot ISO container.

Referring to FIGS. 60–64, the trailer is then backed under the container until the back end 62 of the trailer is near the rear corner fittings 84, 86. The back end 62 is then lifted and two additional bottom wheel assemblies are attached to the rear corner fittings of the first container 52. If the second container 96 (FIG. 67) or the forty foot container 94 (FIG. 68) is being loaded, then the container feet 800 are attached to the rear corner fittings. The trailer is then lowered and pulled the rest of the way under the container. The container is then secured with the proper lockdown mechanisms 500, 700, 750 with the wheel assemblies 600 and container feet 800 still attached. The wheel assemblies 600 and container feet can also be left attached to the containers when the containers are stored. To load and off-load the front container 52 without removing the wheel assemblies from the rear corner fittings 84, 86, wheel chocks (not shown) can be used to keep the container from rolling relative to the ground surface 85. The remaining details of loading and off-loading the containers are as described both above and below.

Intermediate Lockdown Mechanism

Referring to FIGS. 47, 50, and 52, the intermediate lockdown mechanism 700 includes the threaded lockdown extension 662 of the wheel axle 610 and a lockdown bracket 702, 704 having a securement portion 702 and a trailer attachment portion 704. The trailer attachment portion 704 is attached to the trailer 50, and the securement portion 702 selectively connects the lockdown extension to the trailer attachment portion.

The securement portion 702 includes a threaded lockdown extension connector 706 and a generally triangular lockdown flange 708. The trailer attachment portion 704 includes a pair of clips 710, 712 and a central abutment block 714. The lockdown flange 708 defines a slotted extension opening 716 near the top corner of the flange 708 receiving the lockdown extension 662 therethrough, and the clips 710, 712 are connected to the bottom corners of the flange 708, so that the clips are spaced apart. Thus, the flange 708 is attached to the trailer attachment portion. The clips are preferably U-shaped having top and bottom legs 718, 720 with the top legs 718 extending over the top of the deck, and the bottom legs 720 extending under the deck. Thus, the U-shaped clips engage a side flange 68 of the trailer receiving the side flange 68 between the top and bottom legs 718, 720.

The lockdown extension connector 706 comprises a nut which threads onto the lockdown extension 662. A washer 722 is interposed between the lockdown flange 708 and the connector 706. The central abutment block 714 is attached to the trailer side flange 68 underneath the flange at an intermediate location between the front end and back end 62 of the trailer 50.

In operation and with reference to FIGS. 50 and 66, the container is positioned on the trailer, so that the lockdown extension 662 is aligned with the abutment block 714. The clips 710, 712 are then slid onto the trailer side flange. The clips are positioned on opposite sides of the central abutment block 714. Substantially simultaneously, the lockdown extension 662 is inserted into the extension opening 716 of the lockdown flange 708. The extension connector 706 is threaded onto the lockdown extension 662. The clips engage the central abutment block to restrict rearward and forward movement of the container, and the clips also restrict vertical movement of the container. Because a substantially identical lockdown mechanism is used on the opposite side of the container, the clips of the two intermediate lockdown mechanisms combine to restrict side to side movement of the container thereby securing the container to the trailer. If the container is a little off center on the trailer, the extension connector 706 can be further rotated to center the container.

The intermediate lockdown mechanism is preferably used for the rear corners of the first container and the front corners of the second container. Thus, there are four blocks 714 attached to the trailer side flange 68. The intermediate lockdown mechanism 700 can also be used in place of the front lockdown mechanism 750.

Front Lockdown Mechanism

Referring to FIGS. 48, 49, and 51, the front lockdown mechanism 750 includes the rounded lockdown extensions 664 and a lockdown bracket 752, 754 having a securement portion 752 and a trailer attachment portion 754. Again, the trailer attachment portion 754 is attached to the trailer 50, and the securement portion 752 selectively connects the lockdown extension to the trailer attachment portion 754.

The securement portion includes a pair of spaced apart upper legs 756, 758 and a pair of spaced apart lower legs 760, 762. The lower legs 760, 762 are attached to the trailer attachment portion 754. Each upper leg is combined with a lower leg underneath the respective upper leg, and the upper and lower legs are spaced apart to receive the rounded lockdown extensions 664 in the open ended slot therebetween. Thus, the rounded lockdown extension 664 are held between the upper legs 756, 758 and the trailer deck 54 as well as between the upper and lower legs. The rounded lockdown extensions 664 extend from opposite sides of the wheel axle 610 beyond the inside and outside wheels 608, 604, and the upper and lower pairs of legs are sufficiently spaced apart to receive the wheels 604–608 therebetween.

The lower legs 760, 762 each include an outwardly extending tip 764 extending away from the front end of the trailer. The outwardly extending tips 764 act to guide the wheels between the pairs of upper and lower legs 756–762. The bottom legs also define aligned chock pin openings 766 for receiving a chock pin 768 therethrough. A cotter pin 770 is attached to the inside end 772 of the chock pin 768 to secure the chock pin 768 in the chock pin openings 766. The upper legs reduce in thickness toward their back ends 774, so that the opening between the upper and lower legs increases in size towards the back ends of the upper legs to held guide the rounded lockdown extensions between the upper and lower legs 756–762. Further, the back ends 774 are rounded to guide the extensions 664.

The trailer attachment portion 754 preferably comprises a stake hole connector having a top plate 776, a stake hole arm 778, and a bottom plate 780. The stake hole arm 778 is attached to the top plate and extends through a stake hole 73 of the trailer deck, and the top plate 776 sets on top of the trailer deck. The stake hole arm 778 extends beyond or at least flush with the stake hole legs 782. The bottom plate 780 is attached to the stake hole arm 778 with fasteners 784. The fasteners 784 thread into the stake hole arm 778 until the bottom plate 780 engages the stake hole leg 782 thereby holding the top plate 776 securely on top of the deck. The top plate 776 is generally rectangular with an expanded rear portion 786 which extends under the outwardly extending tips 764 of the lower legs 760, 762. The expanded rear portion 786 also includes a ramp 788 allowing the wheels 604–608 to easily roll from the deck to on top of the top plate 776.

Figure 56:
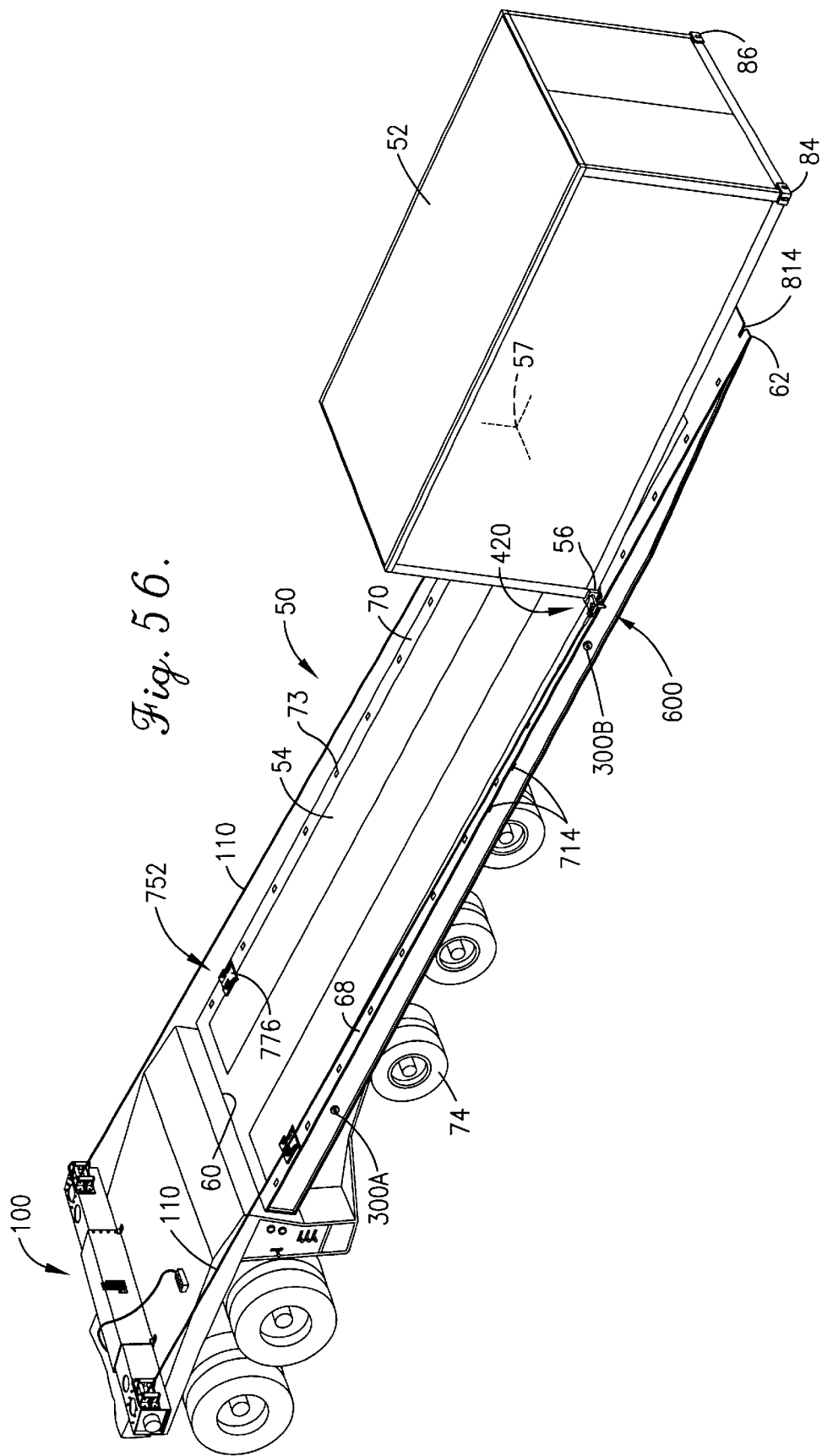
FIG. 56 is a perspective view of a trailer according to the present invention including lockdown brackets and container foot receiving slots according to the present invention.
Figure 57:
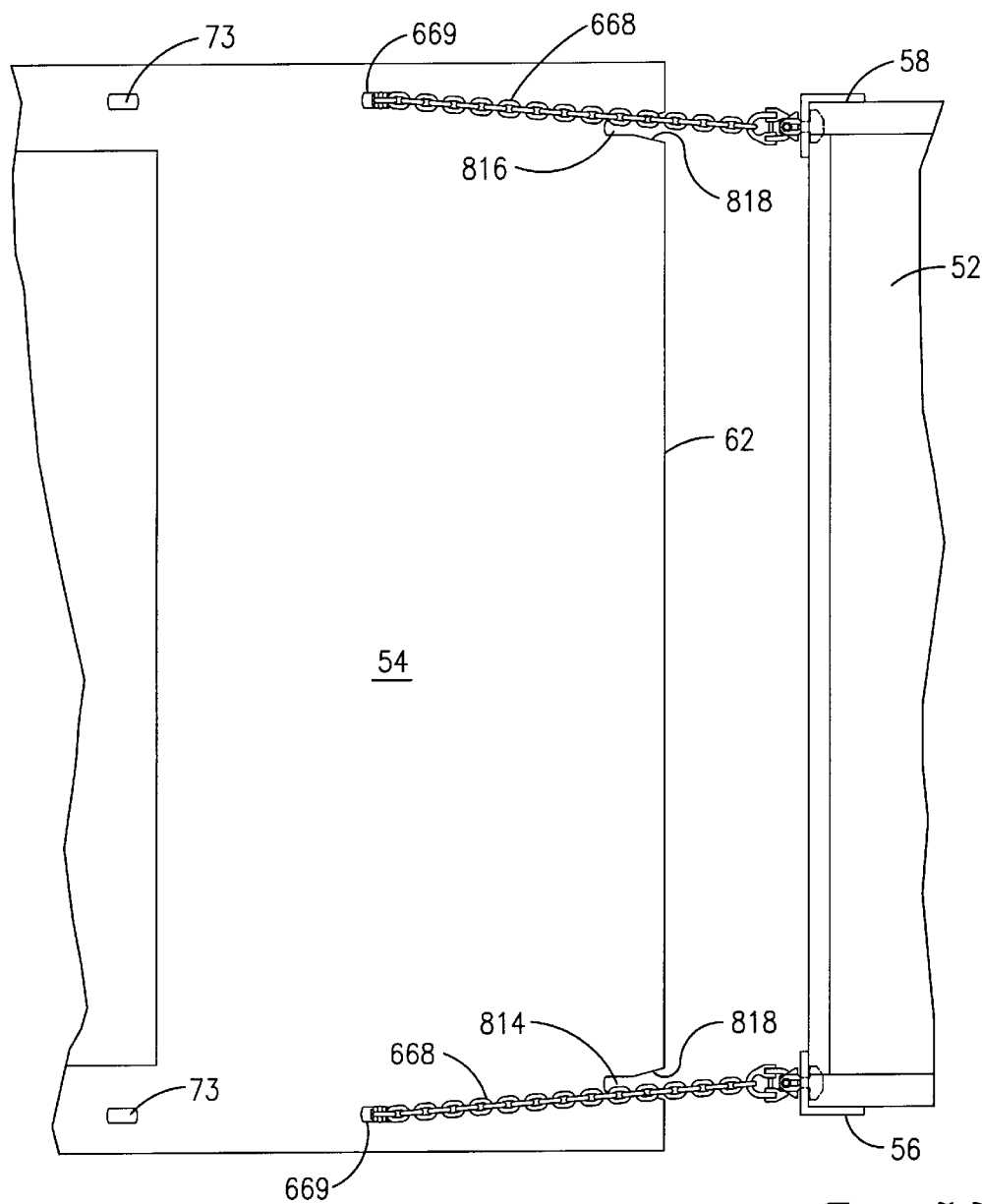
FIG. 57 is a fragmentary top view of a back end of the trailer and a front end of the container illustrating a method for loading the container.
Figure 59:
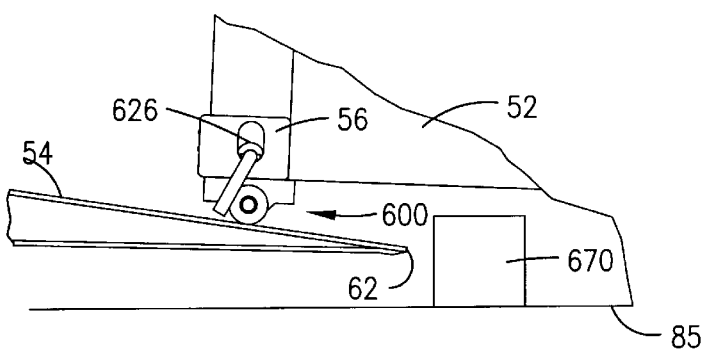
FIG. 59 is a fragmentary side view illustrating a subsequent step in the method for loading the container.
Figure 61:
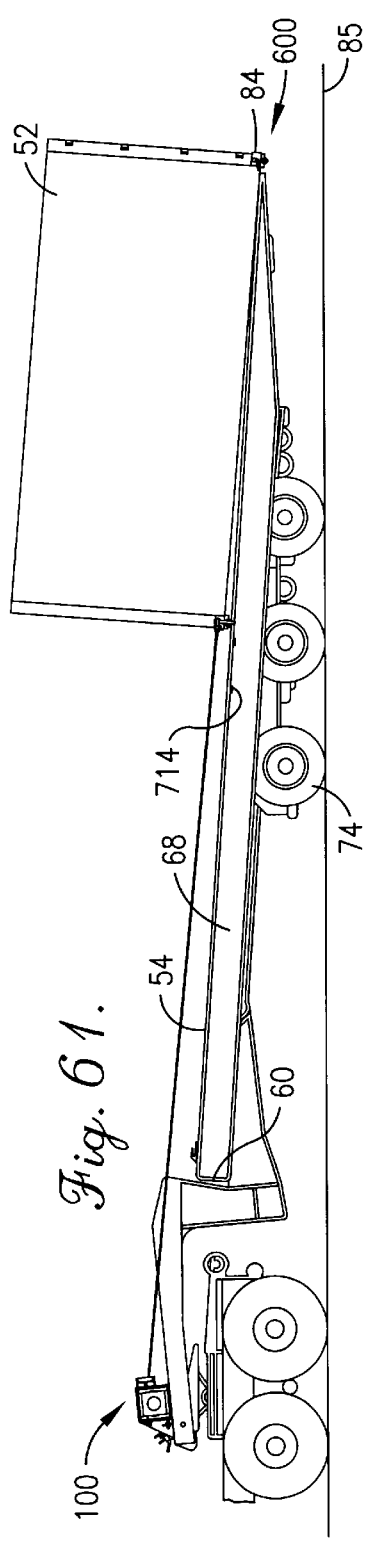
FIG. 61 is a side view illustrating a still further subsequent step in the method for loading the container.
Figure 62:
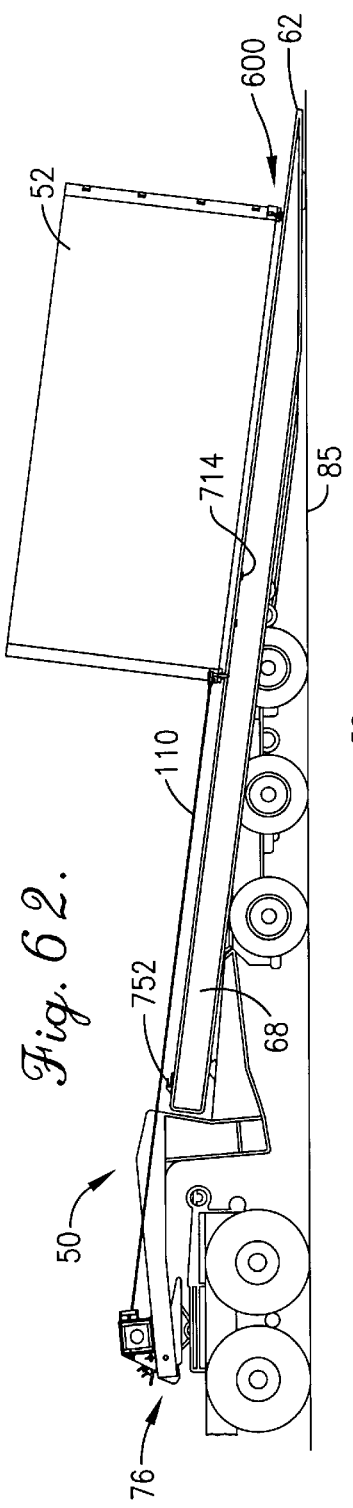
FIG. 62 is a side view illustrating another subsequent step in the method for loading the container.
Figure 63:
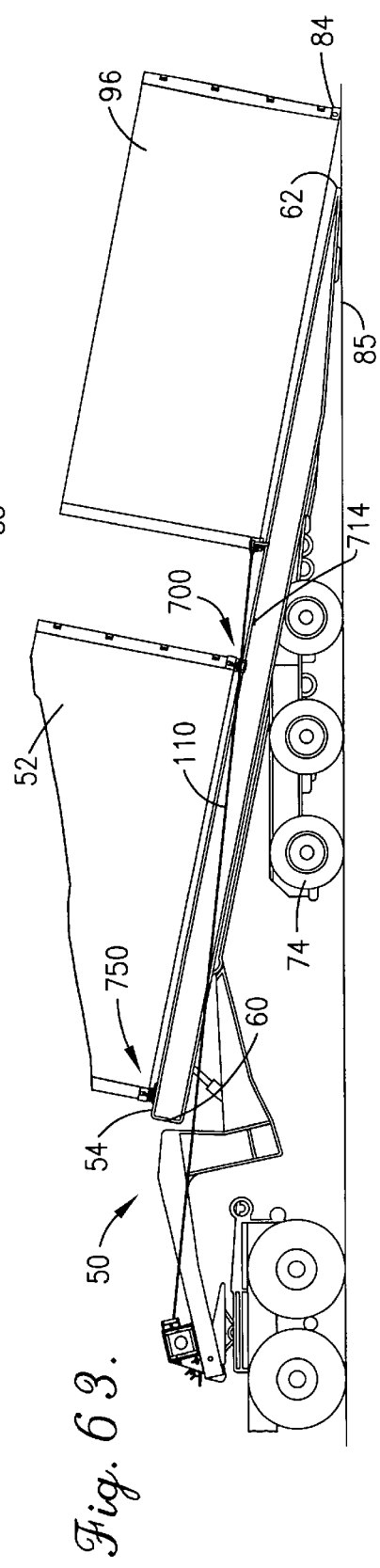
FIG. 63 is a side view illustrating a method for loading a second container behind the first container.

In operation and with reference to FIGS. 48, 49, and 56, the first container 52 is pulled forward by the winch assembly 100 and the wheels 604–608 are pulled up the ramp 788 onto the top plate 776. The container is pulled further forward until the rounded lockdown extension 664 is positioned between the upper and lower legs 756–762 of the securement portion 752. Because the wheel axle is substantially fixed from rotation by the axle key 660 positioned in the key way 640 (FIG. 51), the inward and outward key pins 646, 650 are held in a position where they do not interfere with insertion of the rounded lockdown extensions between the upper and lower legs. As the rounded lockdown extensions 664 are pulled forwardly between the upper and lower legs, the upper leg elastically flexes upwardly as illustrated in FIG. 49. Thus, the rounded lockdown extensions 664 force the upper legs upwardly when the extensions 664 are properly positioned, so that the chock pin 768 can be inserted through the chock pin opening 766 behind the wheels 604–608 fixing the chock pin relative to the upper and lower legs. The upper and lower legs restrict vertical, side to side, and forward movement of the container, and the chock pin 768 restricts rearward movement of the container. Thus, the front lockdown mechanism 750 secures the container 52 on the trailer 50.

The forty foot container 49 utilizes two wheel assemblies and two container feet. The first container 52 has four wheel assemblies attached thereto, and like the forty foot container 94, the second container 96 has two wheel assemblies and two container feet. To accommodate these variations the trailer includes four central abutment blocks 714 and two front lockdown brackets 752, 754.

The above described lockdown mechanism 500 also includes a lockdown extension, securement portion, and trailer attachment portion. The attachment member 502 provides the lockdown extension. The securement member 504, extension member 506, and lock pin 534 make up the securement portion, and the weldment brackets 516 provide the trailer attachment portion.

Container Foot

Figure 55:
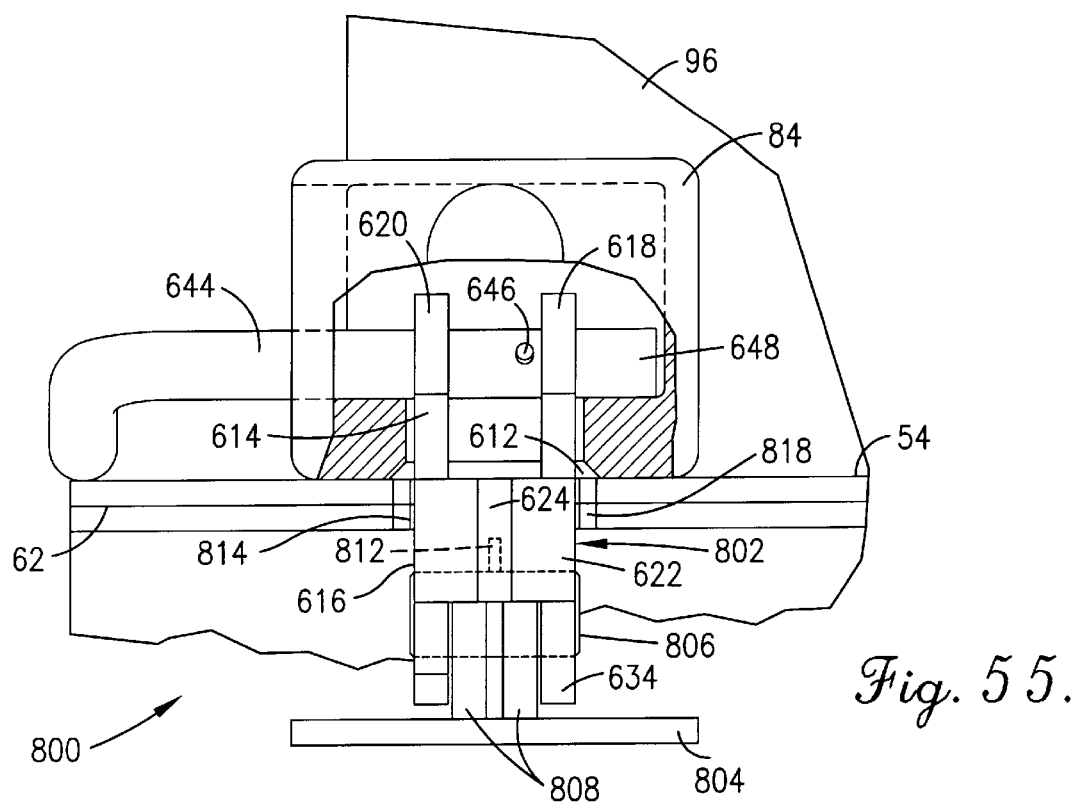
FIG. 55 is a rear view, in partial cross section, of the pivoting container foot of FIG. 53 taken from a perspective of line 55—55 in FIG. 54.
Figure 65:
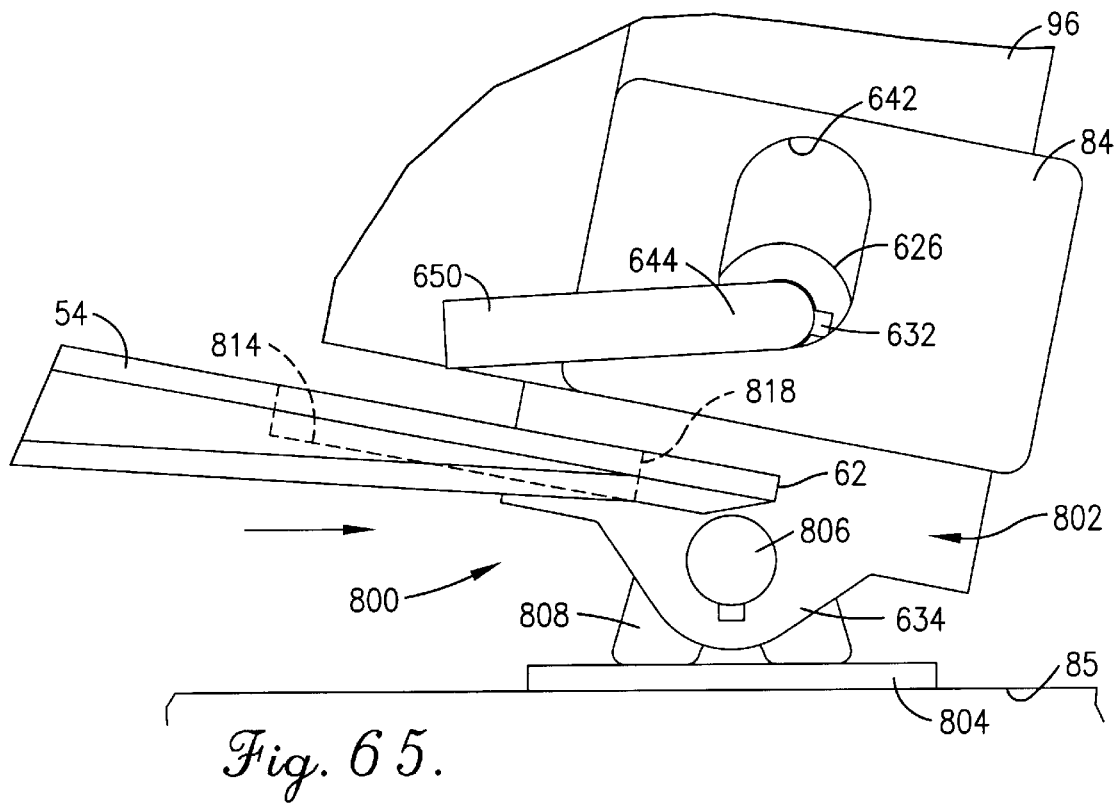
FIG. 65 is a fragmentary side view illustrating a further subsequent step in the method for loading the second container.

Referring to FIGS. 53–55, the container foot 800 includes a foot mounting bracket 802 which is substantially identical to the wheel assembly mounting bracket 602 and attaches to the container in substantially the same way. Thus, it is possible for the disclosed universal mounting bracket to mount a selected one of the bottom wheel assembly 600, the lockdown extensions 662, 664 and the container foot 800.

The container foot further includes a platform 804 pivotally attached to the foot mounting bracket 802, by a pivot pin 806. The platform 804 is substantially rectangular having a large surface area, and a pair of triangular mounts 808 are attached to the top of the platform 804. The mounts define pivot pin receiving openings 810. The pivot pin 806 extends through the wheel axle openings 636, 638 in the mounting bracket 802 and through the pivot pin receiving openings 810. The triangular mounts 808 are positioned between the inside and outside components 618, 620 of the mounting bracket 802, and the pivot pin includes a lock key 812 which is positioned between the triangular mounts 808 to hold the pivot pin in position.

In operation and with reference to FIGS. 55 and 63–66, when loading a second twenty foot container 96 or a forty foot container 94 onto a trailer 50, a container foot 800 is attached to each of the rear corner fittings of the container. Specifically, the trailer is backed underneath the second container 96 until the back end 62 of the trailer is near the rear corner fittings, and then the back end 62 of the trailer is lifted to raise the rear corner fittings. The container feet 800 are then connected to the corner fittings, and the trailer back end 62 is lowered until the platform 804 rests on the ground surface. Because the platform pivots relative to the foot mounting bracket 802, the platform rests parallel to the ground surface 85 thereby distributing the load of the container to minimize or substantially prevent damage to the ground surface.

The trailer is then backed further under the container until the mounting brackets are received in container foot receiving slots 814, 816 (FIG. 57) defined in the back end of the trailer. To guide the foot mounting brackets 802 into the slots 814, 816 each slot includes a widening mouth 818. The receiving slots are sized to securely hold the foot mounting bracket therein, so that the container foot operates as a lockdown for the container. As with the wheel assemblies, the container foot 800 is positioned within the extremities of the container, so that it can be left attached to the container during transport.

Although preferred forms of the invention have been described above, it is to be recognized that such disclosure is by way of illustration only, and should not be utilized in a limiting sense in interpreting the scope of the present invention. Modifications to the exemplary embodiments, as herein above set forth, could be readily made by those skilled in the art without departing from the spirit of the appended claims.

The inventor(s) hereby state their intent to rely on the Doctrine of Equivalents to determine and assess the reasonably fair scope of their invention as it pertains to any apparatus or method not materially departing from but outside the literal scope of the invention as set out in the following claims.

We claim:

1. A lockdown mechanism for securing a container having ISO corner fittings on a trailer, the mechanism comprising:

a wheel assembly for rendering the container mobile when the assembly is attached to the container, said wheel assembly including a mounting bracket insertable into an ISO corner fitting of the container for detachably securing the wheel assembly to the container, said wheel assembly further including a lockdown extension secured to the bracket and a wheel rotatably mounted on the bracket in a position to be disposed below the container when the bracket is inserted into the corner fitting;

a lockdown securement portion for selective connection to the lockdown extension; and a trailer attachment portion connected to the lockdown securement portion, the trailer attachment portion being attachable to the trailer.

2. The lockdown mechanism according to claim 1 wherein the lockdown extension extends from a wheel axle.

3. The lockdown mechanisms according to claim 1 wherein the lockdown extension comprises a front lockdown area and an intermediate lockdown area.

4. The lockdown mechanism according to claim 1 wherein the lockdown extension comprises a threaded lockdown extension.

5. The lockdown mechanism according to claim 4 wherein the lockdown securement portion comprises a threaded lockdown extension connector for threading onto the lockdown extension.

6. The lockdown mechanism according to claim 1 wherein the lockdown securement portion includes a lockdown flange for receiving the lockdown extension therethrough and a lockdown extension connector for connecting to the lockdown extension.

7. The lockdown mechanism according to claim 1 wherein the lockdown securement portion includes an upper leg for receiving the lockdown extension thereunder.

8. The lockdown mechanism according to claim 7 wherein the lockdown securement portion further includes a removable wheel chock pin having a fixed position relative to the upper leg.

9. The lockdown mechanism according to claim 7 wherein the lockdown securement portion further includes a lower leg positioned below the upper leg, the upper and lower legs defining an open ended slot therebetween for receiving the lockdown extension therein.

10. The lockdown mechanism according to claim 1 wherein the trailer attachment portion comprises a stake hole connector.

11. The lockdown mechanism according to claim 1 in combination with a trailer having a trailer deck and a plurality of wheels rotatably mounted under the trailer deck for transportation of the trailer, and wherein the trailer attachment portion is attached to the deck.

12. The lockdown mechanism according to claim 1 wherein the wheel comprises a non-castering wheel.

13. The lockdown mechanism according to claim 1 wherein the lockdown securement portion comprises an upper leg for receiving the lockdown extension between the upper leg and a trailer deck, and the trailer attachment portion comprises a stake hole connector.

14. The lockdown mechanism according to claim 13 wherein the lockdown securement portion includes a lower leg for receiving the lockdown extension between the upper leg and the lower leg.

15. The lockdown mechanism according to claim 13 wherein the upper leg is somewhat movable and is forced upwardly by the lockdown extension when the lockdown extension is positioned between the upper leg and the trailer deck.

16. A lockdown mechanism for securing a container on a trailer, the mechanism comprising:
   a lockdown extension attachable to a container;
   a lockdown securement portion for selective connection to the lockdown extension; and
   a trailer attachment portion connected to the lockdown securement portion,
      the trailer attachment portion being attachable to the trailer,
         wherein the trailer attachment portion comprises a central abutment block for fixed connection to a trailer and a pair of clips connected to the lockdown securement portion,
      the clips being positionable on opposite sides of the central abutment block.

17. The lockdown mechanism according to claim 16 wherein the clips comprise U-shaped clips for engaging a side flange of a trailer deck.

18. The lockdown mechanism according to claim 16 in combination with a trailer having a trailer deck and a plurality of wheels rotatably mounted under the trailer deck for transportation of the trailer, and wherein the central abutment block is attached underneath the trailer deck and adjacent a side of the trailer deck.

19. The combination according to claim 18 wherein the clips comprise U-shaped clips having top and bottom legs receiving the deck therebetween and being positioned on opposite sides of the central abutment block.

20. A lockdown mechanism for securing a container on a trailer, the mechanism comprising:
   a lockdown extension attachable to a container;
   a lockdown securement portion for selective connection to the lockdown extension; and
   a trailer attachment portion connected to the lockdown securement portion,
      the trailer attachment portion being attachable to the trailer,
      the lockdown securement portion including an upper leg for receiving the lockdown extension thereunder,
      the lockdown securement portion further including a lower leg positioned below the upper leg,
      the upper and lower legs defining an open ended slot therebetween for receiving the lockdown extension therein,
         wherein the lockdown securement portion further includes a second upper leg and a second lower leg positioned below the second upper leg.

21. In combination:
   a lockdown extension attachable to a container;
   a lockdown securement portion for selective connection to the lockdown extension;
   a trailer attachment portion connected to the lockdown securement portion,
      the trailer attachment portion being attachable to a trailer,
      the trailer attachment portion comprising a stake hole connector; and
   a trailer having a trailer deck defining a plurality of stake holes and the trailer deck having a plurality of wheels rotatably mounted under the trailer deck for transportation of the trailer,
      wherein the stake hole connector includes a top plate mounted on top of the trailer deck, a stake hole arm connected to the top plate and extending through a selected one of the stake holes, and a bottom plate attached to and securing the stake hole arm in the stake hole.

22. A lockdown mechanism for securing a container on a trailer, the mechanism comprising:
   a lockdown extension attachable to a container;
   a lockdown securement portion for selective connection to the lockdown extension;
   a trailer attachment portion connected to the lockdown securement portion,
      the trailer attachment portion being attachable to the trailer;
   a substantially rigid mounting bracket for attachment to the container; and
   at least one wheel rotatably mounted on and projecting below the mounting bracket,
      said lockdown extension being secured to and extending from the mounting bracket,
         wherein the mounting bracket comprises opposed components defining an upper pair of aligned lock pin openings and a lower pair of aligned wheel axle openings, and the mounting bracket includes a shoulder portion sized to properly position the lock pin openings in an ISO container corner fitting.

23. A lockdown mechanism for securing a container on a trailer, the mechanism comprising:
   a lockdown extension attachable to a container;
   a lockdown securement portion for selective connection to the lockdown extension;
   a trailer attachment portion connected to the lockdown securement portion,
      the trailer attachment portion being attachable to the trailer;
   a substantially rigid mounting bracket for attachment to the container; and
   at least one wheel rotatably mounted on and projecting below the mounting bracket,
      said lockdown extension being secured to and extending from the mounting bracket,
         wherein said at least one wheel includes an inside wheel, an outside wheel, and a central wheel positioned between the inside wheel and the outside wheel.

24. A lockdown mechanism for securing a container on a trailer, the mechanism comprising:
   a lockdown extension attachable to a container;
   a lockdown securement portion for selective connection to the lockdown extension;
   a trailer attachment portion connected to the lockdown securement portion,
      the trailer attachment portion being attachable to the trailer;
   a substantially rigid mounting bracket for attachment to the container; and
   at least one wheel rotatably mounted on and projecting below the mounting bracket, said lockdown extension being secured to and extending from the mounting bracket,
wherein the lockdown securement portion includes a lockdown flange defining an opening for receiving the lockdown extension therethrough and a lockdown extension connector for connecting the lockdown extension to the lockdown flange, and the trailer attachment portion includes a pair of trailer clips attached to opposite ends of the lockdown flange and a central abutment block for fixed attachment to a trailer, and the central abutment block being positionable between the pair of trailer clips.

25. The lockdown mechanism according to claim 24 wherein the lockdown extension comprises a threaded lockdown extension and the lockdown extension connector comprises a threaded member for threading onto the lockdown extension.

* * * * *